US012566238B1

(12) United States Patent 
Onofrio et al.

(10) Patent No.: US 12,566,238 B1 
(45) Date of Patent: *Mar. 3, 2026

(54) SINGLE UNIT OUTDOOR GUNSHOT DETECTION

(71) Applicant: Shooter Detection Systems, LLC, Newburyport, MA (US)

(72) Inventors: Richard Thomas Onofrio, Arlington, MA (US); Ronald A Fowler, Westford, MA (US); Frank Ray Bachmann, Nashua, NH (US)

(73) Assignee: SHOOTER DETECTION SYSTEMS, LLC, Rowley, MA (US)

( * ) Notice: Subject to any disclaimer, the term of this patent is extended or adjusted under 35 U.S.C. 154(b) by 473 days.

This patent is subject to a terminal disclaimer.

(21) Appl. No.: 18/100,608

(22) Filed: Jan. 24, 2023

Related U.S. Application Data

(63) Continuation-in-part of application No. 17/504,579, filed on Oct. 19, 2021, now Pat. No. 11,688,414,
(Continued)

(51) Int. Cl.
G01S 5/20 (2006.01)
G01S 5/00 (2006.01)

(52) U.S. Cl.
CPC ................ G01S 5/20 (2013.01); G01S 5/012 (2020.05)

(58) Field of Classification Search
CPC ..................................... G01S 5/20; G01S 5/012
See application file for complete search history.

(56) References Cited

U.S. PATENT DOCUMENTS

| 3,145,365 A | 8/1964 | Jacobs |
| 4,205,394 A | 5/1980 | Pickens |

(Continued)

FOREIGN PATENT DOCUMENTS

| WO | WO0073811 A1 | 12/2000 |
| WO | WO2009046367 A1 | 4/2009 |

(Continued)

OTHER PUBLICATIONS

González-Castano, Francisco Javier, et al. "Acoustic sensor planning for gunshot location in national parks: A pareto front approach." Sensors 9.12 (2009): 9493-9512.

*Primary Examiner* — Daniel Pihulic 
(74) *Attorney, Agent, or Firm* — Fish & Richardson P.C.

(57) ABSTRACT

Techniques for single unit outdoor gunshot detection are disclosed. Near-infrared band sensing collects infrared information using a gunshot sensor device. The collecting is performed by at least two infrared sensors in a single gunshot sensor device unit. Acoustic information is collected using the gunshot sensor device. The collecting acoustic information is performed by at least two acoustic sensors also co-located in the single gunshot sensor device unit. The infrared sensors and acoustic sensors provide a 180° gunshot detection field. At least two additional infrared sensors and at least two additional acoustic sensors are added to the gunshot sensor device to augment the collecting. The additional infrared sensors and acoustic sensors enable a 360° gunshot detection field. A gunshot is detected using the gunshot sensor device. The detecting is based on analysis of the infrared and the acoustic information. The gunshot sensor device is powered using a solar panel.

23 Claims, 13 Drawing Sheets

Related U.S. Application Data which is a continuation-in-part of application No. 16/876,218, filed on May 18, 2020, now Pat. No. 11,282,358, which is a continuation-in-part of application No. 15/684,925, filed on Aug. 23, 2017, now Pat. No. 10,657,800, which is a continuation-in-part of application No. 15/613,161, filed on Jun. 3, 2017, now abandoned, which is a continuation-in-part of application No. 15/498,283, filed on Apr. 26, 2017, now Pat. No. 10,586,109.

(60) Provisional application No. 63/322,241, filed on Mar. 22, 2022, provisional application No. 63/302,590, filed on Jan. 25, 2022, provisional application No. 63/104,540, filed on Oct. 23, 2020, provisional application No. 62/429,754, filed on Dec. 3, 2016, provisional application No. 62/379,023, filed on Aug. 24, 2016, provisional application No. 62/345,465, filed on Jun. 3, 2016, provisional application No. 62/327,552, filed on Apr. 26, 2016.

(56) References Cited

U.S. PATENT DOCUMENTS

| | | | |
|---|---|---|---|
| 4,375,679 | A | 3/1983 | Park, Jr. et al. |
| 5,930,202 | A | 7/1999 | Duckworth et al. |
| 5,970,024 | A | 10/1999 | Smith |
| 6,178,141 | B1 | 1/2001 | Duckworth et al. |
| 6,621,764 | B1 | 9/2003 | Smith |
| 6,669,553 | B2 | 12/2003 | Adams |
| 6,703,775 | B2 | 3/2004 | Miyamoto et al. |
| 6,720,719 | B2 | 4/2004 | Bartch et al. |
| 6,847,587 | B2 | 1/2005 | Patterson et al. |
| 7,203,132 | B2 | 4/2007 | Berger |
| 7,233,546 | B2 | 6/2007 | Berkovich et al. |
| 7,266,045 | B2 | 9/2007 | Baxter et al. |
| 7,336,764 | B2 | 2/2008 | Reynolds |
| 7,411,865 | B2 | 8/2008 | Calhoun |
| 7,474,589 | B2 | 1/2009 | Showen et al. |
| 7,532,542 | B2 | 5/2009 | Baxter et al. |
| 7,586,812 | B2 | 9/2009 | Baxter et al. |
| 7,599,252 | B2 | 10/2009 | Showen et al. |
| 7,602,329 | B2 | 10/2009 | Manderville et al. |
| 7,688,679 | B2 | 3/2010 | Baxter et al. |
| 7,710,278 | B2 | 5/2010 | Holmes et al. |
| 7,719,428 | B2 | 5/2010 | Fisher et al. |
| 7,732,769 | B2 | 6/2010 | Snider et al. |
| 7,750,814 | B2 | 7/2010 | Fisher et al. |
| 7,751,282 | B2 | 7/2010 | Holmes et al. |
| 7,755,495 | B2 | 7/2010 | Baxter et al. |
| 7,796,470 | B1 | 9/2010 | Lauder et al. |
| 7,855,935 | B1 | 12/2010 | Lauder et al. |
| 7,947,954 | B2 | 5/2011 | Snider et al. |
| 7,961,550 | B2 | 6/2011 | Calhoun |
| 8,036,065 | B2 | 10/2011 | Baxter et al. |
| 8,063,773 | B2 | 11/2011 | Fisher et al. |
| 8,134,889 | B1 | 3/2012 | Showen et al. |
| 8,304,729 | B2 | 11/2012 | Snider et al. |
| 8,325,562 | B2 | 12/2012 | Showen |
| 8,325,563 | B2 | 12/2012 | Calhoun et al. |
| 8,351,297 | B2 | 1/2013 | Lauder et al. |
| 8,369,184 | B2 | 2/2013 | Calhoun |
| 8,478,319 | B2 | 7/2013 | Azimi-Sadjadi et al. |
| 8,642,961 | B2 | 2/2014 | Snider et al. |
| 8,995,227 | B1 | 3/2015 | Johnson |
| 9,240,114 | B2 | 1/2016 | Showen et al. |
| 10,532,960 | B1 | 1/2020 | Domanico |
| 10,586,109 | B1 | 3/2020 | Fowler et al. |
| 10,627,292 | B1 | 4/2020 | Fowler et al. |
| 10,657,800 | B1 | 5/2020 | Fowler et al. |
| 10,662,114 | B2 | 5/2020 | Lettkeman et al. |
| 10,830,866 | B1 | 11/2020 | Onofrio et al. |
| 11,282,353 | B1 | 3/2022 | Fowler et al. |
| 11,282,358 | B1 | 3/2022 | Fowler et al. |
| 11,604,248 | B1 * | 3/2023 | Onofrio ............. G08B 13/1672 |
| 11,688,414 | B1 * | 6/2023 | Onofrio ............. G08B 13/1672 367/128 |
| 12,094,485 | B1 * | 9/2024 | Onofrio ............... G06V 10/764 |
| 12,181,242 | B1 * | 12/2024 | Onofrio .................. F41A 33/02 |
| 2004/0100868 | A1 | 5/2004 | Patterson, Jr. et al. |
| 2004/0146840 | A1 | 7/2004 | Hoover et al. |
| 2007/0120978 | A1 | 5/2007 | Jones et al. |
| 2008/0219100 | A1 | 9/2008 | Fisher et al. |
| 2010/0058947 | A1 | 3/2010 | Davis et al. |
| 2010/0278013 | A1 | 11/2010 | Holmes et al. |
| 2011/0167700 | A1 | 7/2011 | Bozicevic |
| 2012/0064492 | A1 | 3/2012 | Pearce et al. |
| 2012/0275273 | A1 | 11/2012 | Showen |
| 2012/0300587 | A1 | 11/2012 | Azimi-Sadjadi et al. |
| 2013/0343602 | A1 | 12/2013 | Snider et al. |
| 2014/0152890 | A1 | 6/2014 | Rayner |
| 2014/0361886 | A1 | 12/2014 | Cowdry |
| 2015/0070166 | A1 | 3/2015 | Boyden et al. |
| 2015/0071038 | A1 | 3/2015 | Boyden et al. |
| 2015/0177363 | A1 | 6/2015 | Hermann et al. |
| 2015/0268170 | A1 | 9/2015 | Scott et al. |
| 2015/0347902 | A1 | 12/2015 | Butler, Jr. et al. |
| 2016/0086472 | A1 | 3/2016 | Herrera et al. |
| 2016/0133107 | A1 | 5/2016 | Showen et al. |
| 2016/0203809 | A1 | 7/2016 | Brock-Fisher et al. |
| 2016/0225242 | A1 | 8/2016 | Kane et al. |
| 2016/0232774 | A1 | 8/2016 | Noland et al. |
| 2016/0260307 | A1 | 9/2016 | Skorpik et al. |
| 2016/0358393 | A1 | 12/2016 | Penland |
| 2017/0123038 | A1 | 5/2017 | Griggs et al. |
| 2017/0169686 | A1 | 6/2017 | Skorpik et al. |
| 2017/0261283 | A1 | 9/2017 | Crouch |
| 2019/0180728 | A1 | 6/2019 | Alie et al. |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

* cited by examiner

400

410

420

430

432

440

600

DETECT SECOND IR PULSE
FROM SECOND STROBE
710

DETERMINE FREQUENCY OF SECOND
STROBE OCCURRENCE
720

EDIT DETECTION OF SECOND STROBE
730

700

1200

SINGLE UNIT OUTDOOR GUNSHOT DETECTION

RELATED APPLICATIONS

This application claims the benefit of U.S. provisional patent applications "Single Unit Outdoor Gunshot Detection" Ser. No. 63/302,590, filed Jan. 25, 2022 and "Outdoor Gunshot Detection Using Sensor Aegis" Ser. No. 63/322, 241, filed Mar. 22, 2022.

This application is also a continuation-in-part of U.S. patent application "Low Power Gunshot Detection" Ser. No. 17/504,579, filed Oct. 19, 2021, which claims the benefit of U.S. provisional patent application "Low Power Gunshot Detection" Ser. No. 63/104,540, filed Oct. 23, 2020.

The U.S. patent application "Low Power Gunshot Detection" Ser. No. 17/504,579, filed Oct. 19, 2021 is also a continuation-in-part of U.S. patent application "Gunshot Detection in an Indoor Environment" Ser. No. 16/876,218, filed May 18, 2020.

The U.S. patent application "Gunshot Detection in an Indoor Environment" Ser. No. 16/876,218, filed May 18, 2020, is also a continuation-in-part of U.S. patent application "Gunshot Detection within an Indoor Environment" Ser. No. 15/684,925, filed Aug. 23, 2017, which claims the benefit of U.S. provisional patent applications "Gunshot Detection within an Indoor Environment" Ser. No. 62/379, 023, filed Aug. 24, 2016 and "Testing of Gunshot Sensors" Ser. No. 62/429,754, filed Dec. 3, 2016.

The U.S. patent application "Gunshot Detection within an Indoor Environment" Ser. No. 15/684,925, filed Aug. 23, 2017, is also a continuation-in-part of U.S. patent application "Indoor Gunshot Detection Analysis with Ongoing Fire Alarm" Ser. No. 15/613,161, filed Jun. 3, 2017, which claims the benefit of U.S. provisional patent applications "Indoor Gunshot Detection Analysis with Ongoing Fire Alarm" Ser. No. 62/345,465, filed Jun. 3, 2016, "Gunshot Detection within an Indoor Environment" Ser. No. 62/379, 023, filed Aug. 24, 2016, and "Testing of Gunshot Sensors" Ser. No. 62/429,754, filed Dec. 3, 2016.

The U.S. patent application "Indoor Gunshot Detection Analysis with Ongoing Fire Alarm" Ser. No. 15/613,161, filed Jun. 3, 2017, is also a continuation-in-part of U.S. patent application "Indoor Gunshot Detection with Video Analytics" Ser. No. 15/498,283, filed Apr. 26, 2017, which claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

Each of the foregoing applications is hereby incorporated by reference in its entirety.

FIELD OF ART

This application relates generally to gunshot analysis and more particularly to single unit outdoor gunshot detection.

BACKGROUND

Violent crimes involving firearms have been rampant over the last decades. The "gun problem" has reached the point that lawmakers, protestors, church groups, parents' groups, and others are demanding that action be taken now to quell the rise in violence. Some argue that stricter regulations and outright bans of classes of firearms are the only ways forward. Others are taking a different approach, arguing that the violence has become a public health emergency. Recent statistics indicate that one in three people in the United States knows a gunshot victim. On average, 106 Americans are murdered with guns every day, and another 210 are treated for gunshot wounds. In 2015 alone, more than 12,000 people were killed in the United States by a gun, and many others were injured. Gun violence now occurs in a wide variety of public places, such as schools, places of worship, sporting venues, nightclubs, businesses, hospitals, and airports. While the increased use of metal detectors, body scanners, and other security measures such as physical searches are routinely employed to detect, prohibit, and exclude firearms from such venues, incidents of gun violence in public places continue to increase.

The use of electronic devices for gunshot detection is replacing tasks formerly conducted by trained personnel. Gunshot detection is performed for a variety of purposes and applications in areas that include the military, law enforcement, security, and public safety. Gunshot detection is highly complex due to the vast numbers of weapons and explosive devices that can generate the gunshot event. Identifying the point of origin of the gunshot is essential to quickly identifying and tracking a suspected shooter while protecting others in the area at the time of the gunshot. Yet, the identification of the source of the gunshot is complicated by many factors including the spatial environment in which the gunshot event occurs. Gunshot detection and shooter identification are critical elements in many military, law enforcement, security, and public safety scenarios.

Some early work in detecting gunshots in an outdoor setting involved using several microphones distributed at known locations over a large area. A gunshot is typically sufficiently loud that it can be heard many thousands of meters away. The occurrence of a gunshot would be registered by some microphones, with the gunshot sound arriving at slightly different times. A gunshot could be registered multiple times even at the same microphone due to echoes, also referred to as the multipath problem. For example, the speed of sound in dry air at sea level at 68° Fahrenheit is about 1125 feet/second. A gunshot that occurs somewhere between two microphones that are situated 2500 feet apart would be detected at the microphones one or even two seconds apart, which is an easily detectable difference. Furthermore, the relative times of detection are an indication of the proximity of the gunshot to one microphone versus another microphone. Unfortunately, this scheme cannot distinguish between gunshots and other similar explosive sounds, such as car backfires, construction noises, fireworks, thunder, etc.

SUMMARY

Violent crimes involving firearms have been and remain significant societal crises. Government agencies, law enforcement, emergency services, and others seek rapid detection of gun-involved events so a swift and appropriate response can be mounted. However, accurate gunshot detection is complicated. External environmental factors such as lightning, and manmade factors such as sirens and strobes from fire alarms, or loud music and flashing lights at concerts, pose difficult challenges to outdoor gunshot detection. Disclosed embodiments provide techniques that utilize a single unit, position-independent outdoor gunshot sensor device. Embodiments provide a processor-implemented method for gunshot analysis. The method can include collecting infrared information using a gunshot sensor device. The infrared information is collected using near-infrared (NIR) band sensing to detect a muzzle flash and to provide motion detection. The IR sensors are in single gunshot sensor device unit. The gunshot sensor device can use cable-free communication to a network. The gunshot sensor device is powered by a solar panel. The method can include collecting acoustic information using the gunshot sensor device, where the collecting acoustic information is performed by acoustic sensors also co located in the single gunshot sensor device unit. The acoustic information can be used to identify a high-intensity gunshot sound, and to correlate, using the gunshot sensor device, the high-intensity gunshot sound to the infrared information that was collected. The collected IR information can be buffered. The correlating can include establishing a temporal correspondence between the gunshot sound and an infrared event that occurred in time before the gunshot sound. The temporal correspondence can identify the number of milliseconds (time) between the events. The method can include detecting a gunshot using the gunshot sensor device. The detecting can be based on the additional infrared information and the acoustic information. The gunshot sensor device can use cable-free communication to a network. The method includes using the cable-free communication to notify the network of a possible gunshot occurrence, based on the detecting. The notifying can be based on an analysis of the high-intensity gunshot sound and an NIR event that were correlated. Thus, the disclosed embodiments are configured to minimize false positives due to external environmental factors.

A processor-implemented method for gunshot analysis is disclosed comprising: collecting infrared information using a gunshot sensor device, wherein the collecting infrared information is performed by at least two infrared sensors co located in a single gunshot sensor device unit, and wherein the infrared information is collected using near-infrared (NIR) band sensing; collecting acoustic information using the gunshot sensor device, wherein the collecting acoustic information is performed by at least two acoustic sensors also ce-located in the single gunshot sensor device unit; and detecting a gunshot using the gunshot sensor device, wherein the detecting is based on analysis of the infrared information and the acoustic information.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
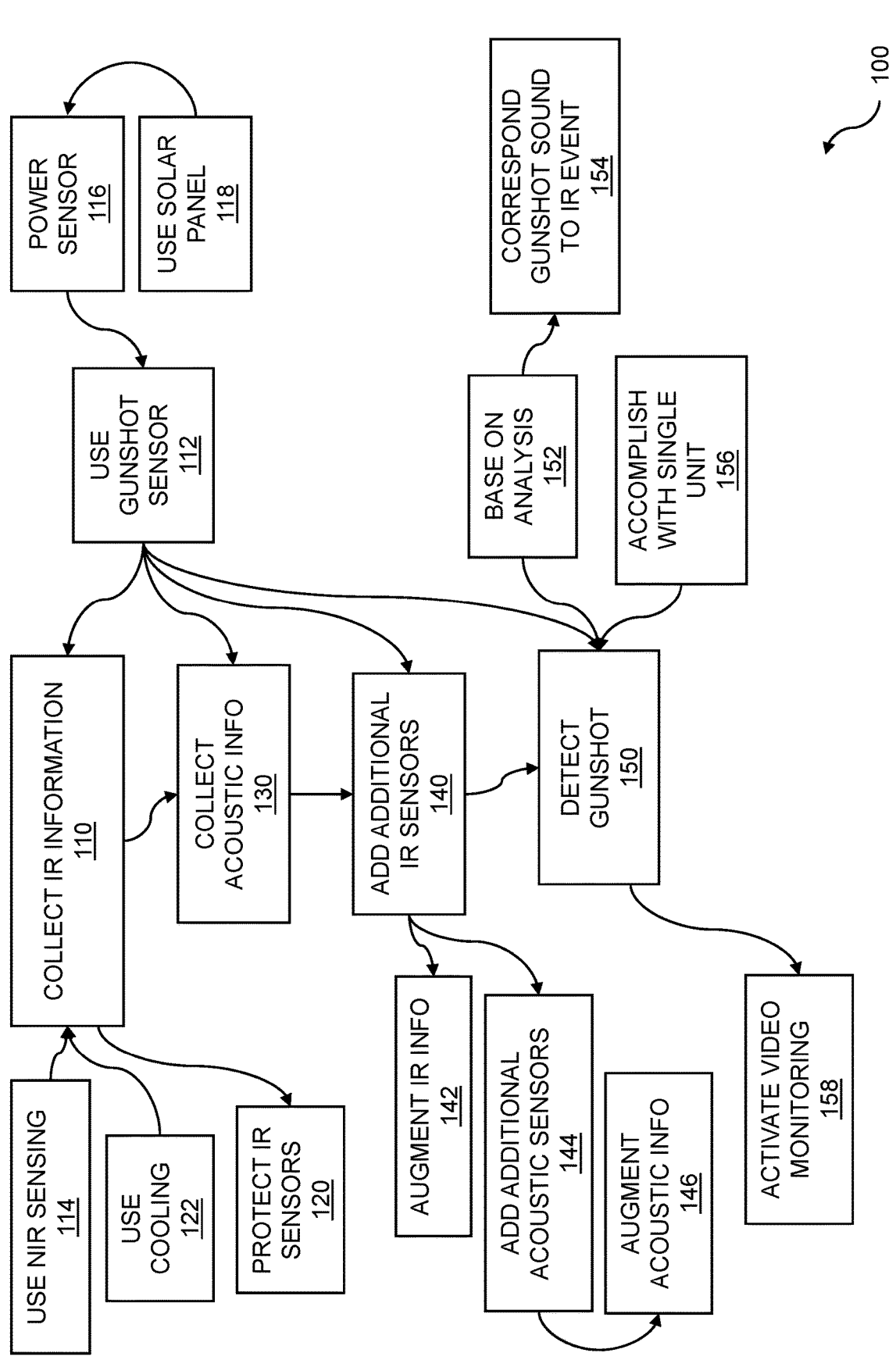
FIG. 1 is a flow diagram for single unit outdoor gunshot detection.

Techniques for single unit outdoor gunshot detection are described herein. The safety and security of the public have become paramount concerns for law enforcement, government officials, emergency responders, business owners, educators, hospital administrators, and many others. Security concerns have risen dramatically as the numbers of active shooter events have increased. The rapid and accurate identification of true gunshots and the elimination of other high sound pressure level or "false" events are critical to the protection of the public. The gunshots can be identified by their loud acoustic signatures and associated muzzle flashes. The acoustic signatures include muzzle blasts and acoustic shock waves. To detect gunshot occurrences, a single unit gunshot sensor device can be situated in an outdoor environment. The gunshot sensor device can include multiple individual sensors, including, but not limited to, at least two infrared sensors using near-infrared sensing and at least two acoustic sensors. The acoustic sensors can detect the acoustic pressure wave that is typically emitted by a firearm when it is fired. Further, a firearm also typically emits energy within the infrared spectrum when fired. Thus, by detecting the infrared emission that is coincidental with a detected acoustic pressure wave, a presumption of a gunshot can be inferred. The acoustic sensor can be configured to detect the initial pressure wave emitted from a firearm. In essence, the acoustic sensor can only detect very loud, sudden bursts of acoustic energy associated with a gunshot, such as shock waves and/or loud blasts. Other high sound pressure level (SPL) sounds, such as loud music, slamming doors, and shouting voices, do not generally trigger the acoustic pressure sensor due to lower SPL values of different attack and decay profiles. The near-infrared sensor, however, can be deceived by naturally occurring IR sources such as lightning and sunlight reflecting off of surfaces, and by strobe lights often associated with a fire alarm or other alarm. This deceiving of one or more of the IR sensors can trigger infrared sensor activation and can lead to false positive gunshot detections.

The disclosed single unit outdoor gunshot sensor device provides numerous advantages. One advantage is a legal benefit in that the acoustic sensor detects high SPL acoustic signals while not recording low SPL acoustic signals such as voices, as would a traditional microphone. Excluding voices maintains privacy and confidentiality in the outdoor environment, since the acoustic sensor does not pick up conversations or other verbal events that might occur outdoors. Another key advantage is that the acoustic sensor is configured to detect the primary acoustic wave from the firearm, but is unlikely to pick up reverberations and echoes from reflected sound waves. These secondary acoustic waves that may reverberate off of the exterior walls of buildings and other hard surfaces, or may travel down multiple alleyways or streets in the outdoor environment, are generally ignored by the acoustic sensor. Thus, a position-independent gunshot sensor is facilitated. There is no need for special calibrations or other setup of the single unit gunshot sensor in a given outdoor environment. The elimination of calibration is particularly advantageous for expansive outdoor environments such as plazas, parks, town squares, and so on. Thus, the analyzing can be accomplished without tuning the gunshot sensor for the outdoor environment in which the gunshot sensor resides. Furthermore, the analyzing can provide a distance from the shooter to the sensor. In some environments, multiple gunshot sensors can be used. The installation of the gunshot detection system in these outdoor environments is straightforward and time efficient because there is no need to select a particular position within the outdoor environment, nor is there a need for any pre-use calibration. These capabilities enable the disclosed systems to be quickly and efficiently installed in outdoor environments, providing the desired gunshot detection.

In some configurations, multiple gunshot sensors can be used. The multiple sensors are connected to a gateway device that receives data from the gunshot sensors and can report the data upstream to a monitoring system, emergency warning system, or another suitable system. In some configurations, the gunshot sensor can further include a video camera and a microphone. The microphone can be connected to a pickup circuit with its gain set such that the microphone only picks up very loud noises (e.g., 110-130 decibels or greater), such as a muzzle blast, and does not pick up ordinary conversation. In some embodiments, a lower decibel threshold is set to enable detection of acoustically suppressed (e.g., silenced) or lower caliber weapons. In some embodiments, a video management system is integrated and enabled to provide various notification capabilities to law enforcement, emergency services, the military, or other organizations. In some embodiments, the video camera and microphone are only activated after a gunshot detector detects a possible gunshot. Thus, if a gunshot is detected in the outdoor environment, the microphone and video camera can be activated in an attempt to record audio and video of the scene and possibly to record audio and video of the suspect(s) who fired the gunshot. In such embodiments, the gunshot sensor enters a surveillance mode once a gunshot has been detected, and the gain of the microphone circuit can be adjusted to pick up additional sounds such as speech. The recorded audio and video information can be of tactical importance to law enforcement so that they can better understand the extent of injuries and casualties, and can also assess the number of shooters on the scene.

A further challenge of gunshot detection in an outdoor environment is the various external environmental factors that can occur in temporal proximity to a gunshot. For example, a fire alarm can create both a very loud noise and a flashing strobe. At a concert, music can be very loud, and there might be a multitude of strobes and other flashing lights as part of the show. Disclosed systems can accommodate such environmental factors and still provide effective gunshot detection with a position-independent gunshot sensor placed in an outdoor environment, thus enabling effective and efficient gunshot monitoring, and improving public safety.

A typical firearm discharge involves various phenomena. There is a muzzle flash, which emits visible and infrared light. A muzzle flash typically comprises multiple phases, which include a primary flash, an intermediate flash, and a secondary flash. The primary flash results as hot, highly compressed gases, which are the unburned propellants, exit the barrel along with the projectile. These gases expand rapidly, not mixing with the atmosphere, then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is in the infrared (IR) region. This is in contrast to other environmental factors in an outdoor environment, such as fire alarm strobes. The light emitted by a fire alarm strobe is mostly in the visible spectrum, with a much lower IR component. Thus, detecting IR energy is an important aspect of gunshot detection.

A shock wave following a gunshot event, which is caused by the supersonic travel of the expelled projectile/bullet, can also occur. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp down to the minimum pressure, and then an abrupt offset. Most common events within an outdoor environment do not cause a shock wave. For example, a door slamming, while perceived as loud to someone within its hearing, does not cause a shock wave such as that which would result from supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet down and out of the rifled gun barrel. The hot, rapidly expanding gases cause a muzzle blast to emerge from the barrel. The acoustic disturbance can have a duration in the range of 3 to 5 milliseconds and can propagate through the air at the speed of sound.

To illustrate, a single unit outdoor gunshot sensor device can be in a standby or low power mode until a potential gunshot sound, a motion, or a combination sound and motion event occurs. In the standby or low power mode, data buffering or storage can be suspended in order to conserve electrical energy. Once a potential sound or motion event is detected, the sensor can begin to collect acoustic and IR data. The IR data can be collected using one or more near-infrared sensors. Data can be held in a buffer such as a circular buffer, in direct memory access (DMA) storage, and so on. An engine such as a DMA engine within an outdoor gunshot detection sensor processor can manage the collection while the processor itself is in a sleep mode (e.g., the processor is not clocked; only needed peripherals and the DMA engine are clocked). A loud acoustic event that surpasses a minimum threshold sound pressure level (SPL) can occur. The high SPL event can cause the sensor to move to a higher power mode. Additional data can then be collected and joined with previously collected, stored, or buffered data.

The acoustic and IR data can be analyzed for a potential gunshot event. The data collection can include pre-event, event, and post-event data. The collected data can be buffered or stored. If a gunshot is detected, an alert can be sent. If the event is determined not to be a gunshot, the sensor can return to a low power collection mode. If motion is not subsequently detected for a predetermined amount of time (e.g., 10 minutes), regardless of whether a loud acoustic event occurred, the low power data collection mode can be exited, and the sensor can remain in the ultra-low power motion detection mode. Another motion detection event can cause the sensor to repeat the above-described steps. Additionally, a motion detection alerting function can be enabled such that the sensor can transmit a "motion detected" alert to a receiving server or gateway. This alerting function can operate independently from the gunshot detection functionality.

FIG. 1 is a flow diagram for single unit outdoor gunshot detection. The flow 100 includes collecting infrared information 110 using a gunshot sensor device 112. The gunshot sensor device can be contained within a housing. The gunshot sensor device can be mounted in an outdoor environment. The outdoor environment or space can include a plaza, a square, a park, a green space, an area around buildings, and so on. The mounting of the gunshot sensor device can be based on one or more specifications. In embodiments, the single gunshot sensor device unit can be mounted at least two meters above the ground. The single gunshot sensor device can be mounted on a post, a pole, a vertical wall, a bridge or overpass, and the like. In embodiments, the collecting infrared information can be performed by at least two infrared sensors in a single gunshot sensor device unit. The infrared (IR) information can include far-infrared (FIR) and mid-infrared (MIR) sensing data. In embodiments, the infrared information is collected using near-infrared (NIR) band 114 sensing. The near-infrared band can include infrared wavelengths between 0.78 μm and 3 μm. The collecting of infrared information can be accomplished by providing power to one or more infrared sensors. The power can be provided to the IR sensors while other components associated with the gunshot sensor device are powered down, in a standby mode, and so on. Embodiments include powering 116 the gunshot sensor device. The powering of the gunshot sensor device can be accomplished using a solar panel 118 coupled to the single gunshot sensor device unit. Power produced by the solar panel can be collected in a battery, stored in a capacitor, etc., so that power can be provided during an overcast sky, at night, etc. Discussed below, the single unit outdoor sensor device can be coupled to a network using a cable such as an Ethernet™ cable. If such a configuration is present, the gunshot sensor device can be powered using cabled power techniques such as power over Ethernet™ (PoE). Embodiments further include protecting infrared sensors 120 of the gunshot sensor device using a low iron soda lime glass. The low iron soda lime glass can protect the IR sensors against tampering, the accumulation of dust or dirt etc. The IR sensors can require cooling in order to operate at a desired performance level. In embodiments, the at least two infrared sensors are cooled 122 using thermoelectric cooling. The collecting IR information can be accomplished while components other than the IR sensors can be in a powered down, low power, or standby state. The gunshot sensor device can be placed into a higher-power mode. The higher-power mode can be activated when a potential gunshot event is detected by the gunshot sensor device. The higher-power mode can enable the infrared information collection, processing and analysis of the infrared information, and the like. Discussed below, the higher-power mode can enable cable-free communication of gunshot sensor health data by the outdoor gunshot sensor device over a network. The network can be used to enable communication between the gunshot sensor device and a gunshot detection gateway. The gunshot sensor gateway can enable communication between the gunshot sensor device and law enforcement, emergency services, etc.

The flow 100 includes collecting acoustic information 130 using the gunshot sensor device. The acoustic information that is collected can include high sound pressure level (SPL) sounds such as a high-intensity gunshot sound; low SPL sounds such as conversations, shouts, screams, crying, or other sounds including human-generated sounds; and so on.

The acoustic information can selectively include high SPL or low SPL sounds. In embodiments, the collecting acoustic information is performed by at least two acoustic sensors also in the single gunshot sensor device unit. The collecting the acoustic information and the collecting the IR information can be enabled by a high SPL event, an optical event, motion detection, and the like. The motion detection can start collection of IR and/or acoustic information, adjust gain of a component used for collecting IR/acoustic information, initiate collection buffering of IR/acoustic information, change collection power modes for IR/acoustic information, etc. The motion detection can initiate an alert to a downstream network that motion has been detected. The acoustic information can include detection of a shock wave and/or a sound wave. The shock wave and/or the sound wave are detected with an acoustic sensor. The shock wave emanates from the projectile as it travels through the air at supersonic speeds. The acoustic information can include the sound wave from the firearm itself. The sound wave may be detected by a microphone that is coupled to a pickup circuit. The gain of the pickup circuit can be configured to detect only very loud sounds (e.g., 110-130 decibels or greater). In embodiments, the acoustic information includes only the sound wave from the firearm itself. In this case, the shock wave could have been attenuated, missing, or otherwise misdirected such that it is not included and not necessary or required to detect and confirm the gunshot. Shock waves are typically formed due to events such as supersonic travel of a projectile, or a nearby lightning strike. The sound wave is a loud sound emitted from the firearm upon discharge. Other factors in an outdoor environment, such as fire alarms, doors slamming, vehicle backfires, and the like can also cause loud sounds.

The flow 100 further includes adding at least two additional infrared sensors 140 to the gunshot sensor device so that at least four infrared sensors are used. The additional infrared sensors can be substantially similar to the at least two infrared sensors previously discussed. The additional infrared sensors can accomplish near-infrared band sensing. The additional sensors can accomplish other band sensing such as far-infrared sensing or mid-infrared sensing. In the flow 100, the additional infrared sensors can be used to augment 142 the collecting infrared information. The augmenting can be used to improve gunshot sensing, to expand a gunshot area of coverage, and the like. In a usage example, adding at least two additional infrared sensors to augment the infrared sensing can expand a gunshot detection area from 180° to 360°. The flow 100 further includes adding at least two additional acoustic sensors 144 to the gunshot sensor device. The at least two additional acoustic sensors can include sensors substantially similar to the at least two acoustic sensors previously discussed. The at least two additional acoustic sensors can include sensors which can be used to detect the acoustic information at different sound pressure levels. In the flow 100, the additional acoustic sensors can be used to augment 146 the collecting acoustic information. The augmented acoustic information can include high SPL information such as gunshots or other loud sounds, low SPL information voices, etc.

The infrared and the acoustic sensors associated with the single unit outdoor gunshot sensor device can be used to provide a gunshot area of coverage. In embodiments, the at least two infrared sensors and at least two acoustic sensors can provide a 180° gunshot sensor device field of detection. The gunshot sensor device can be formed in various geometric shapes, configurations, and so on. In embodiments, the gunshot sensor device unit can be semicircular in disposition. The IR and the acoustic sensors can be mounted in various configurations to the gunshot sensor device. In embodiments, the at least two infrared sensors and the at least two acoustic sensors are mounted in vertical, heterogeneous pairs around the lateral perimeter of the gunshot sensor device unit. In other embodiments, the at least two infrared sensors and the at least two acoustic sensors alternate physically along a lateral perimeter of the gunshot sensor device unit. In embodiments, at least three infrared sensors and at least three acoustic sensors are mounted in vertical, heterogeneous pairs around a lateral perimeter of the gunshot sensor device unit. The at least three infrared sensors and at least three acoustic sensors can enable a 180° gunshot sensor device unit field of detection. In embodiments, at least six infrared sensors perform the collecting infrared information. In embodiments, at least six acoustic sensors perform the collecting acoustic information. And in embodiments, the at least six infrared sensors and the at least six acoustic sensors enable a 360° gunshot sensor device unit field of detection. In embodiments, the gunshot sensor device unit is circular in disposition. In further embodiments, the at least six infrared sensors and the at least six acoustic sensors are mounted in vertical, heterogeneous pairs around the lateral perimeter of the gunshot sensor device unit.

Described previously, additional infrared and additional acoustic sensors can be added to the gunshot sensor device. The additional sensors can provide an additional gunshot area of coverage. In embodiments, the at least two additional infrared sensors and the at least two additional acoustic sensors enable a 360° gunshot sensor device field of detection. The 360° gunshot sensor device field of detection can be accomplished by combining two 180° gunshot sensor device fields of detection. In embodiments, the gunshot sensor device unit can be circular in disposition. The sensors and the additional sensors can be mounted to the gunshot sensor device. In embodiments, the at least two infrared sensors, the at least two additional infrared sensors, the at least two acoustic sensors, and the at least two additional acoustic sensors are mounted in vertical, heterogeneous pairs around the lateral perimeter of the gunshot sensor device unit. One or more single unit gunshot detection sensors can be mounted in an outdoor environment, as discussed throughout, but also in an indoor environment or a mixed indoor-outdoor environment. In addition, the nature of the single unit gunshot detection system enables it to be portable and easily set up or re-set up in various and divers environments.

The flow 100 includes detecting a gunshot 150 using the gunshot sensor device. The detecting can be based on analysis 152 of the infrared information, the acoustic information, or both. A gunshot event can include a flash such as a muzzle flash, a high SPL signal such as a high-intensity gunshot sound, and so on. In embodiments, the detecting is based on the additional infrared information and the additional acoustic information that augments the infrared information and acoustic information, respectively. In the flow 100, the analysis of the infrared information and the acoustic information includes making a correspondence 154 between a gunshot sound and an infrared event that occurred in time before the gunshot sound. In the flow 100, the detection is accomplished using a single gunshot sensor device unit 156. The detecting can be based on signal processing techniques where the signal processing techniques can be applied to the infrared and the acoustic information. In embodiments, the detecting is accomplished using information only from the single gunshot sensor device unit. In embodiments, the single gunshot device unit can include embedded processing to perform the detecting. The embedded processing can be accomplished with a computer chip, a processor chip, a processor core within a chip, and so on. In other embodiments, the single gunshot device unit can include embedded network connectivity to provide the detecting. The detecting can be provided by a server, a blade server, a cloud-based service, etc. The analysis can provide localizing of the gunshot using only the single unit gunshot detection system. For example, range and direction of the gunshot with respect to the gunshot sensor can be calculated.

The analysis for detecting a gunshot can include filtering. Filtering of spurious information can include filtering out of periodic acoustic sources such as a klaxon from a fire alarm; alerts from other alarms such as a siren, a bell, or a buzzer; and so on. The infrared information and the acoustic information can be monitored continuously, periodically, or based on detecting a possible gunshot event. The monitoring can include scanning the acoustic data that is collected for acoustic information with one or more characteristics. The characteristics can include a high amplitude, or SPL; a duration; a signature; an envelope; and so on. The monitoring can be performed by the gunshot sensor device based on a schedule such as a monitoring mode for open hours of a park or public space, and a different monitoring mode after closing. The monitoring can include monitoring for an anomaly in the acoustic information such as a signal with a magnitude or SPL in excess of a nominal level, an average level, a running average level, and so on. In embodiments, the collecting and the monitoring can include a low-power mode of the gunshot sensor device. The monitoring can be performed continuously in order to conserve operating power.

In the flow 100, the detecting a gunshot activates a video monitoring device 158. The video monitoring device can include one or more cameras, where the cameras can include webcams, video cameras, and so on. The cameras can include cameras that detect various light wavelength bands such as a visible light band, an infrared light band, and the like. Detection of a gunshot event can initiate communications with various services such as law enforcement, the military, first responders, and the like. In embodiments, the gunshot sensor device can use cable-free communication to a network. The cable-free communication to a network can include a wireless communication technique such as Wi-Fi, Bluetooth™, Zigbee™, Low Power Wide Area Network (LPWAN), and so on, for short-range or medium-range exchange of information, control of information, etc. The cable-free communication to a network can be based on a cellular communication system, such as a commercial or private cellular telephone network or system. The network can include a computer network such as the Internet, a wide area network (WAN), a local area network (LAN), a purpose-built network, and the like. The network can be used to provide one or more notifications of a possible gunshot occurrence, based on the detecting. The notifying can be accomplished using direct communication between a gunshot detection device and a gateway, a server, etc. The notifying can be based on messages, codes, data exchanges, and the like. The network can include a computer network such as the Internet, a local area network (LAN), a wide area network (WAN), an ad hoc network, a self-configuring network, a mesh network, and so on. In embodiments, the cable-free communication to a network can include one or more powered communication relay devices. The powered communication relay devices, or "repeaters", can receive information using cable-free communication and can forward the information using wireless or wired techniques. The repeaters can be powered by utility power, backup power, a battery, etc. In other embodiments, the cable-free communication to a network can provide data to a gunshot detection gateway. The notifying can include sending data as a stream or as packets, sending an email, sending a short message service (SMS) text, and the like.

In embodiments, the notifying can be based on an analysis of a high-intensity gunshot sound and an NIR event that were detected. The notifying can be based on an analysis of the high-intensity gunshot sound and the infrared event that was correlated. As discussed throughout, a high-intensity gunshot sound can correspond to an infrared event that occurred in time before the gunshot sound. The analysis can also include matching the gunshot sound to a gunshot signature of a particular weapon. The analysis can be used to filter out periodic IR pulses that can result from a flashing fire alarm, a security breach alert, a lockdown siren, etc. The analysis can also be used for filtering out the IR noise of higher power bulbs, halogen lightbulbs, fluorescent light-bulbs, and so on. The IR noise that is filtered out can be related to powerline frequencies, such 50 Hz or 60 Hz, or to a multiple of powerline frequencies, such as 120 Hz, or to some other periodic IR stimulation frequency. The analysis can enable spurious acoustic information filtering such as reducing echo, filtering out false positive sounds, etc. The analysis can be performed by the gunshot sensor device. In embodiments, additional analysis can be performed by the gunshot sensor device after the analysis of the high-intensity sound and the high-intensity infrared event that was corre-lated. The additional analysis can include collecting addi-tional acoustic information and IR information from one or more other gunshot sensor devices. The additional analysis can include collecting other data types. In further embodi-ments, the network can be notified based on the additional analysis. In embodiments, the possible gunshot occurrence activates a video monitoring device. A video camera or sensor can be activated to capture video data near the location of the possible gunshot occurrence, at one or more other locations within an outdoor environment, an indoor environment, or a mixed indoor-outdoor environment. In other embodiments, the video monitoring device is part of a video monitoring system.

The gunshot sensor device can include various configu-rations. The various configurations can include numbers of sensors, housing configurations, mounting configurations, and so on. The gunshot sensor device can include a housing that can be mounted on a post or a pole, attached to an outside wall of a building or structure, hung from a bridge or overpass, and so on, within an outdoor environment. In embodiments, at least two infrared sensors such as near-infrared (NIR) band sensors can be located in a housing. Near-infrared sensors located in the housing can provide motion detection. A near-infrared band sensor can be used to initiate buffering of IR and NIR information. The buffering can be initiated based on detecting motion, a high SPL acoustic event, and so on. At least two acoustic sensors can be co located in the housing. The acoustic sensors can be used to detect acoustic signals comprising various sound pressure levels. The acoustic sensors can collect high-intensity sounds, which enables acoustic monitoring. In embodiments, the single gunshot sensor device unit can include exactly three infrared sensors and exactly three acoustic sensors and is positioned against a solid backing structure. The solid backing structure can include a wall such as an outside wall of a building. In embodiments, the single gunshot sensor device unit can be mounted at least two meters above the ground. In other embodiments, the single gunshot sensor device unit can include exactly six infrared sensors and exactly six acoustic sensors and is positioned at least two meters from any solid backing structure. The gunshot sensor device can be mounted on a post, a pole, and so on.

Discussed throughout, powering the gunshot sensor device can be accomplished using a solar panel coupled to the single gunshot sensor device unit. The solar panel can be used to charge energy storage devices such as one or more batteries, one or more capacitors, and so on. Batteries or capacitors, if any, can be contained within, on, or next to housing. A battery can be rechargeable, single use, etc. A rechargeable battery can be recharged using the solar cell, a trickle charger, and the like. The battery of the gunshot sensor device occupies less than 200 cubic centimeters of volume. In some embodiments, the single gunshot sensor device can be coupled to a network such as an Ethernet™ network using a cable. The network to which the device is coupled can be used to send alerts, alarms, messages, email messages, and so on. In embodiments, the single gunshot sensor device can be powered by the Ethernet™ cable using a power over Ethernet™ (PoE) technique. The gunshot sensor device further includes a processor contained in the housing, where the processor is coupled to the acoustic sensors and the NIR band sensors, and wherein the processor is connected to a battery. The processor can process and analyze near-infrared data, acoustic data, and so on. The processor can control the power consumption of the gunshot detection device, enable communication by the device, etc. A cable-free communication device can be contained within the housing. The cable-free communication device can enable cable-free communication to a computer network, a cellular network, and so on. The cable-free communication device can be coupled to the processor and is connected to the battery to provide gunshot analysis to a network Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
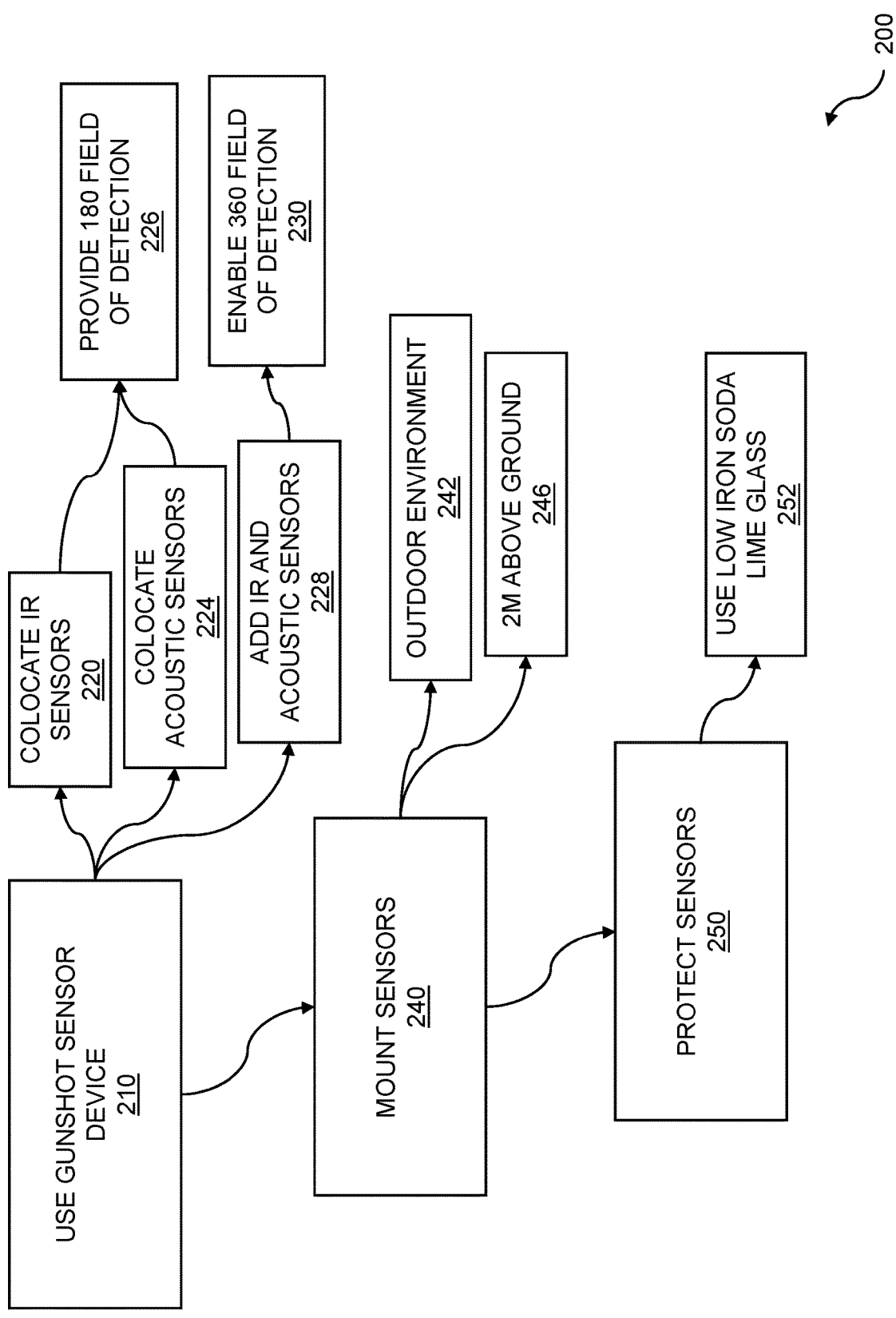
FIG. 2 is a flow diagram for gunshot sensor deployment.

FIG. 2 is a flow diagram for gunshot sensor deployment. Discussed previously and throughout, acoustic information and near-infrared information are collected and analyzed using a gunshot sensor device. The acoustic and near-IR information can be collected from an environment such as an outdoor environment. The acoustic information is moni-tored for a high sound pressure level (SPL) event such as a gunshot sound, where the sound is correlated to a corre-sponding infrared event that occurred in time before the gunshot sound. The near-infrared band is sensed to detect a muzzle flash. The near-infrared band can also be sensed for motion detection of a shooter. A gunshot can be detected based on the near-infrared information and the acoustic information. The collecting and detecting enable single unit outdoor gunshot detection. The gunshot sensor device can use cable-free communication to a network. The network can be used to interconnect a plurality of gunshot sensor devices, to connect one or more gunshot sensor devices to a server, and so on. The network can be notified of a possible gunshot occurrence by the gunshot sensor device using cable-free communication. Infrared information is collected using a gunshot sensor device, wherein the collecting infra-red information is performed by at least two infrared sensors in a single gunshot sensor device unit, and wherein the infrared information is collected using near-infrared (NIR)

band sensing. Acoustic information is collected using the gunshot sensor device, wherein the collecting acoustic information is performed by at least two acoustic sensors also in the single gunshot sensor device unit. A gunshot is detected using the gunshot sensor device, wherein the detecting is based on analysis of the infrared information and the acoustic information.

The flow 200 includes using a gunshot sensor device 210. The gunshot sensor device can include an outdoor gunshot sensor device. The outdoor gunshot sensor device can include infrared (IR) sensors, acoustic sensors, an analysis device, a communication device, and a power source. The outdoor gunshot sensor device can include at least two infrared (IR) sensors. The at least two IR sensors can include far-infrared sensors, mid-infrared sensors, and so on. The at least two IR sensors can include near-infrared (NIR) sensors. In the flow 200, the at least two near-IR sensors can be 220 within the outdoor sensor device. The device can further include at least two acoustic sensors. The acoustic sensors can include high sound pressure level (SPL) sensors, micro-phones, and so on. In the flow 200, the at least two acoustic sensors are also 224 in the single gunshot sensor device unit. The device can be configured to cover a field of detection. In embodiments, the at least two infrared sensors and at least two acoustic sensors provide a 180° gunshot sensor device field of detection 226. The flow 200 further includes adding at least two additional infrared sensors and at least two additional acoustic sensors 228 to the gunshot sensor device to augment the collecting acoustic information. The sensors can be mounted in heterogeneous pairs to the outdoor gunshot sensor device. In embodiments, the at least two infrared sensors, the at least two additional infrared sensors, the at least two acoustic sensors, and the at least two additional acoustic sensors can be mounted in vertical, heterogeneous pairs around the lateral perimeter of the gunshot sensor device unit. The sensors and the additional sensors can provide a field of detection that is greater than the 180° field of detection provided by the at least two heterogeneous pairs of IR and acoustic sensors. In the flow 200, the at least two additional infrared sensors and the at least two additional acoustic sensors can enable a 360° gunshot sensor device field of detection 230.

In the flow 200, the single gunshot sensor device unit is mounted 240 so that gunshots can be detected. The gunshot sensor device can be mounted on a pole or post, attached to a vertical surface such as a wall, suspended from an overhead surface such as under a bridge or overpass, and so on. The gunshot sensor device can be mounted in a physically secure location. In embodiments, the gunshot sensor device is mounted in an outdoor environment 242. The outdoor environment can include an urban environment, a suburban environment, and so on. The outdoor environment can include an area surrounding one or more buildings, a compound, etc. The mounting of the gunshot device can be positioned in order to enhance performance of the device. In the flow 200, the single gunshot sensor device unit is mounted at least two meters above the ground 246.

For a variety of reasons, individuals may seek to disable, damage, tamper with, or otherwise compromise the gunshot sensor device. The thwarting of gunshot detection may be desired for military or nefarious reasons, among others. Thus, the gunshot sensor device must be mounted using physically secure techniques. In addition to human interference with the sensor device, the device can be susceptible to environmental hazards. Water infiltration into the device can damage components of the device, causing the device to fail. Further, dust, dirt, grease, or other foreign materials can "blind" the IR sensors. The flow 200 further includes protecting 250 infrared sensors of the gunshot sensor device. Various techniques can be used to cover, shield, or otherwise protect the IR sensors. In the flow 200, the protection of the IR sensors is accomplished using a low iron soda lime glass 252.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
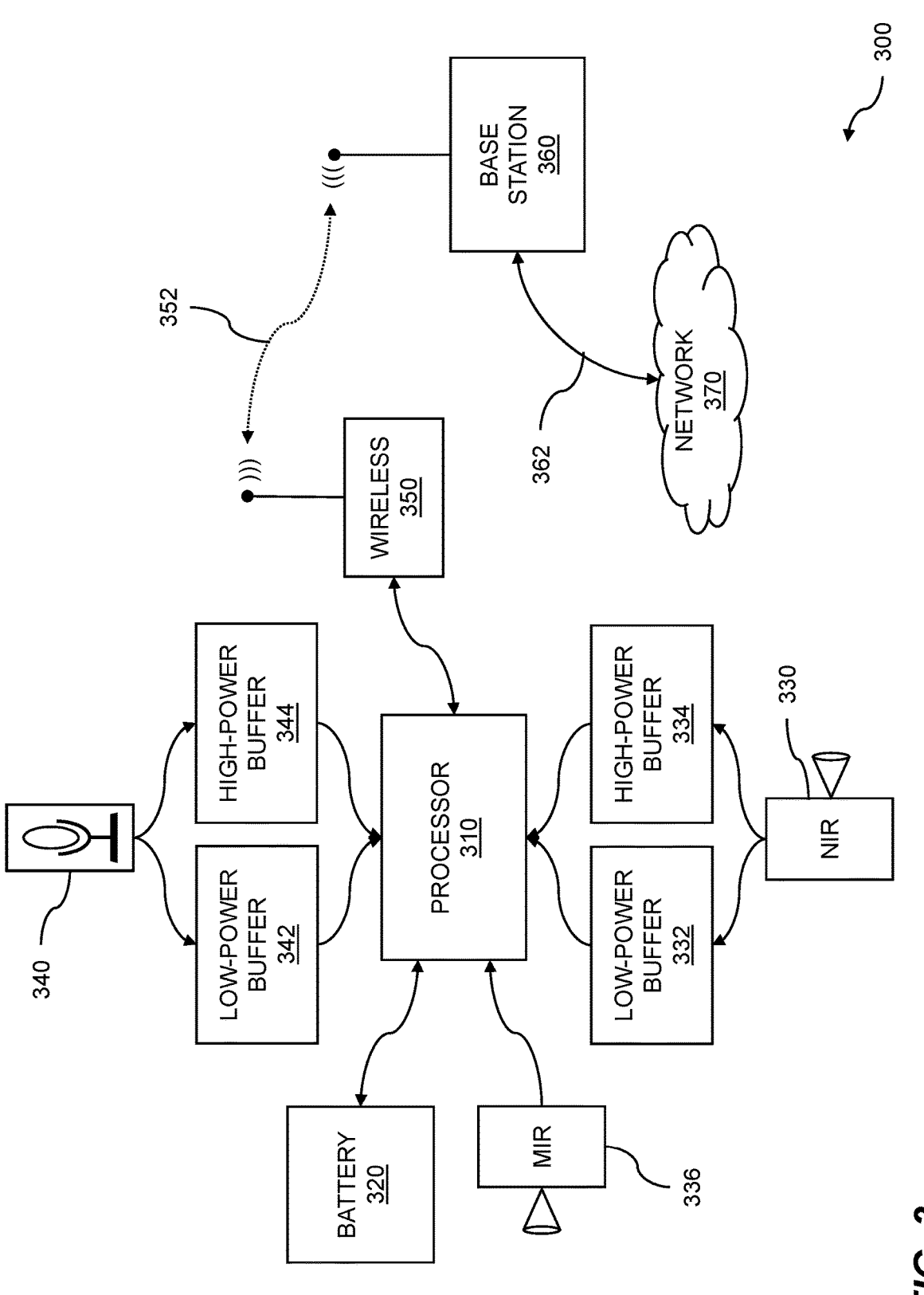
FIG. 3 is a system diagram for cable-free communication with a base station.

FIG. 3 is a system diagram for cable-free communication with a base station. Cable-free communication with a network, a base station, and other components enables cable-free gunshot detection. The gunshot detection includes single unit outdoor gunshot detection. Infrared information is collected using a gunshot sensor device, wherein the collecting infrared information is performed by at least two infrared sensors eo located in a single gunshot sensor device unit, and wherein the infrared information is collected using near-infrared (NIR) band sensing. Acoustic information is collected using the gunshot sensor device, wherein the collecting acoustic information is performed by at least two acoustic sensors also co located in the single gunshot sensor device unit. A gunshot is detected using the gunshot sensor device, wherein the detecting is based on analysis of the infrared information and the acoustic information.

The system 300 can include a processor 310. As discussed throughout, the processor can perform a variety of tasks related to gunshot detection. The tasks performed by the processor can include controlling the operation of various components of the outdoor gunshot detection system. The tasks can further include testing tasks, self-diagnostic tasks, etc. The control of operation can include executing codes, apps, algorithms, heuristics, procedures, subroutines, tasks, etc., related to gunshot detection. The processor can include a standalone processor such as an integrated circuit or chip that comprises the processor, a processor within an integrated circuit, a processor core within a programmable chip such as a field programmable gate array (FPGA), a processor core within an application specific integrated circuit (ASIC), and the like. The processor can perform a variety of tasks related to gunshot detection such as collecting infrared (IR) information or acoustic information, buffering the IR or acoustic information, processing the IR or acoustic information, and so on. The processor can enable monitoring for possible gunshot occurrences. The monitoring can be based on detecting IR data that includes one or more wavelengths, detecting acoustic data with a range of high sound pressure levels, etc. The monitoring can include monitoring infrared data or acoustic data for muzzle flashes, high-intensity gunshot sounds, other gunshot related events, or other events such as explosions. The processor can perform further operations relevant to gunshot detection. These other processor operations can include correlating a high-intensity gunshot sound to buffered infrared information, determining a type of firearm, tracking a suspect, notifying a network of a possible gunshot occurrence, etc. The system 300 can include a battery 320. The battery can include a rechargeable battery, a non-rechargeable battery, a single-use battery, and so on. A rechargeable battery may be recharged using a solar cell, a trickle charger, or the like. In embodiments, the battery can occupy less than 200 cubic centimeters of volume. The battery can include a nickel-cadmium battery, a sealed lead acid battery, a lithium iron phosphate battery, etc.

The system 300 can include a near-infrared sensor 330. The near-infrared (NIR) sensor can collect near-infrared information within an environment such as an outdoor environment or an indoor environment. The near-infrared sensor can detect near-infrared band light with wavelengths between 0.78 μm and 3 μm. The system can include two or more near-infrared sensors, where the two or more near-infrared sensors can be oriented to cover different fields of view, overlapping fields of view, redundant fields of view, and so on. The near-infrared sensor can sense possible gunshot occurrences such as muzzle flashes. The near-infrared information is buffered within the gunshot sensor device. In embodiments, the near-infrared information that is buffered can use a low-power infrared information buffer 332 and a high-power infrared information buffer 334. The low-power infrared information buffer and the high-power infrared information buffer can be coupled to the processor 310 within the gunshot detection system. In embodiments, the low-power infrared information buffer can enable gunshot event confirmation. The gunshot event confirmation can include correlating a high-intensity gunshot sound (discussed shortly) to the near-infrared information that was buffered. The confirmation can be based on correlating, where the correlating can include establishing a temporal correspondence between the gunshot sound and an infrared event that occurred in time before the gunshot sound. In other embodiments, the high-power infrared information buffer can enable spurious infrared information filtering. Spurious infrared information can result from natural phenomena such as a lightning flash; sunlight flashing off a shiny surface such as a wave, a windshield, or a window; and so on. In embodiments, the spurious infrared information filtering can include fire alarm filtering. The need for fire alarm filtering can result from a strobing light alert, where the spectra of the strobe can bleed over into the infrared range. In other embodiments, the spurious infrared information filtering includes high-level ambient light filtering. The need for high-level ambient light filtering can result from sunlight or another bright light source shining onto the near-infrared sensor 330. In addition to the one or more near-infrared sensors, the system 300 can include a mid-infrared (MIR) sensor 336. The mid-infrared sensor can detect mid-infrared band light with wavelengths between 3 μm and 50 μm. The mid-infrared information collected by the mid-infrared light sensor can be used to provide motion detection. The motion detection can be used to detect motion of a person within the outdoor or indoor environment monitored by the gunshot sensor device.

The system 300 can include an acoustic sensor 340. The acoustic sensor can include a microphone, an audio transducer, or another component appropriate for providing acoustic information to a digital system such as a low power gunshot detection system. The acoustic sensor can include a low gain level for collecting only high sound pressure level (SPL) signals; a high gain level for collecting low SPL signals such as conversation, shouting, screaming, crying, whispering, or other human-generated sounds; and so on. The system 300 can include two or more acoustic sensors, where the acoustic sensors can cover different spaces such as large outdoor spaces, multi-room and multi-corridor indoor spaces, overlapping spaces, redundant spaces, and the like. The acoustic sensor can sense possible gunshot occurrences such as high-intensity gunshot sounds. The high-intensity sounds can include sound pressure levels ranging from 120 dB to 160 dB. Embodiments further include buffering the acoustic information. The acoustic information can be buffered, where the buffering can be accomplished using more than one buffer. In embodiments, the acoustic information that is buffered can use a low-power buffer 342 and a high-power buffer 344. The buffers, including the low-power acoustic information buffer 342 and the high-power acoustic information buffer 344, can be coupled to the processor 310 within the gunshot detection system. The processor can be used to accomplish a variety of audio processing techniques such as detecting, correlating, filtering, establishing, matching, and so on. In embodiments, the low-power acoustic information buffer can enable gunshot event detection. The information within the low-power acoustic information buffer can be monitored for a high-intensity gunshot sound. The monitoring can be based on detecting a high-intensity sound, examining the waveform or signature of the high-intensity sound, etc. In other embodiments, the high-power acoustic information buffer can enable spurious information filtering. Spurious information can result from banging equipment such as heavy machinery, loud sounds from extending or retracting bleachers, cheering crowds, crowds clapping or stomping feet in unison, vehicle horns, vehicle backfires, and so on.

The system 300 can include a wireless interface 350. The wireless interface can enable cable-free communication to one or more additional gunshot detection systems, to communication equipment, to a network such as a computer network or a cellular telephony network, and so on. The wireless interface can communicate using one or more wireless communication techniques including Wi-Fi, Bluetooth, Zigbee, near-field communication (NFC), and so on. The wireless interface may use a low power communication technique to reduce power consumption, to evade detection, to avoid interference with other wireless systems and services, etc. In embodiments, the cable-free communication 352 to a network can include one or more power communication relay devices. A power communication relay device can detect a signal and retransmit the signal. The communication relay devices, or "repeaters", can repeat a signal from the wireless interface to extend range, to transfer a signal from one wireless interface to another wireless interface, to convert the wireless signal to a wired signal, and the like. The system 300 can include a base station 360. The base station can be in communication 362 with a network 370, such as the Internet or other computer network, a cellular network, etc. In embodiments, the cable-free communication to a network can provide data to a gunshot detection gateway. The gunshot detection gateway can aggregate data from one or more gunshot detection systems. Embodiments include periodic excursions to a higher-power mode by the gunshot sensor device. Using periodic excursions to higher power can conserve battery life. The higher-power mode enables cable-free communication from a network of gunshot sensor health data to a gunshot detection gateway. The gunshot sensor health data can be associated with the operation of a gunshot sensor system, the accuracy or efficacy of the system, and the like. In embodiments, the health data can include one or more of gunshot sensor device identification (ID), battery levels, battery drain rate, self-diagnostic data, local communication data, or additional event data. The gunshot detection gateway can collect possible gunshot occurrence information, can aggregate possible gunshot occurrence information, and so on. The gunshot detection gateway can access network-based resources such as servers or databases to analyze possible gunshot occurrences. In embodiments, the gunshot detection gateway corroborates an actual gunshot occurrence based on data communicated from one or more additional gunshot sensor devices.

Figure 4:
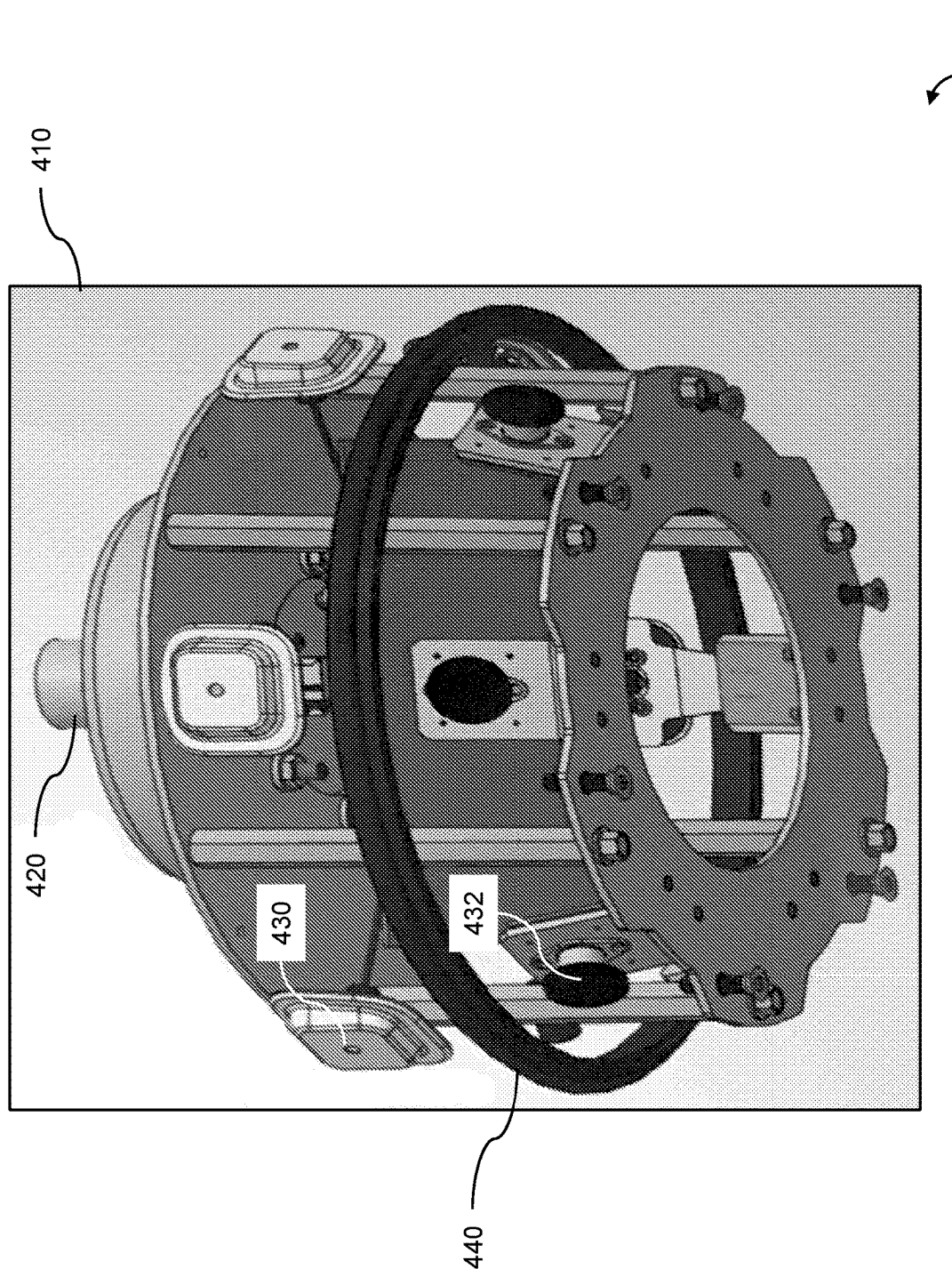
FIG. 4 illustrates outdoor gunshot detector components.

FIG. 4 illustrates outdoor gunshot detector components. A gunshot detector can be mounted in an outdoor environment for use in the detection of gunshot events. Since an outdoor environment in particular can include high sound pressure level (SPL) sounds associated with natural phenomena such as thunder, earthquakes, toppling trees, and so on; or man-made high SPL events such as alarms, sirens, or vehicle backfires; the gunshot detector must be able to distinguish a gunshot from among other high SPL events. To determine that an event such as an acoustic event is a gunshot rather than a different acoustic event, the gunshot detector can include a plurality of components to detect acoustic events, optical events, and so on. The gunshot detector can then analyze the acoustic and optical events, determine whether there is a correspondence in time between the events, etc. The components associated with the gunshot sensor enable single unit outdoor gunshot detection. An apparatus for gunshot analysis comprises: at least two infrared sensors in a single gunshot sensor device unit, wherein the at least two infrared sensors collect infrared information using near-infrared (NIR) band sensing; at least two acoustic sensors in the single gunshot sensor device unit; an analysis device, coupled to the at least two infrared sensors and the at least two acoustic sensors, wherein the analysis device comprises at least one processing element; a communication device, coupled to the analysis device, wherein the communication device provides notification of gunshot detection, based on an output from the analysis device; and a power source, with the single gunshot sensor device unit, wherein the power source energizes the infrared sensors, the acoustic sensors, the analysis device, and the communication device.

Components associated with an outdoor gunshot detector are shown 400. The gunshot sensor device unit 410 can include a frame 420 to which mounting hardware such as brackets and plates can be attached. Additional components can include daughter boards for mounting sensors and interconnecting components such as connectors, couplers, cables, wires, and so on. Sensors can be coupled to the outdoor gunshot detector. In embodiments, the sensors can include IR sensors, such as IR sensor 430, and acoustic sensors, such as acoustic sensor 432. The gunshot detector can include at least two infrared sensors and at least two acoustic sensors. In embodiments, the at least two infrared sensors and the at least two acoustic sensors can be mounted in vertical, heterogeneous pairs around the lateral perimeter of the gunshot sensor device unit, like the heterogeneous pair comprising IR sensor 430 along with acoustic sensor 432. The mounting of heterogeneous pairs of sensors provides a field of coverage for detecting gunshots. In embodiments, the at least two infrared sensors and the at least two acoustic sensors can provide a 180° gunshot sensor device field of detection. A gunshot sensor configured to provide a 180° gunshot sensor device field of detection can be simpler than the round detector shown. In embodiments, the gunshot sensor device unit is semicircular in disposition. The frame 420 can include a support structure 440 along a lateral perimeter of the gunshot sensor device unit 410.

Discussed previously and throughout, embodiments can further include adding at least two additional infrared sensors to the gunshot sensor device to augment the collecting infrared information. In addition to the added IR sensors, at least two additional acoustic sensors can be added to the gunshot sensor device to augment the collecting acoustic information. The additional IR sensors and the additional acoustic sensors can be mounted to the gunshot detector device. In embodiments, the at least two infrared sensors, the at least two additional infrared sensors, the at least two acoustic sensors, and the at least two additional acoustic sensors can be mounted in vertical, heterogeneous pairs around the lateral perimeter of the gunshot sensor device unit. The additional acoustic and IR sensors can enable a greater field of detection. In embodiments, the at least two additional infrared sensors and the at least two additional acoustic sensors can enable a 360° gunshot sensor device field of detection. The gunshot sensor device comprising at least two IR sensors, at least two acoustic sensors, at least two additional IR sensors, and at least two additional acoustic sensors can be arranged using two semicircular gunshot sensor devices to form a gunshot sensor unit in a circular disposition. Power can be provided to the gunshot sensor device using a variety of techniques. Further embodiments can include powering the gunshot sensor device using a solar panel coupled to the single gunshot sensor device unit. The solar panel can provide electrical power that can be stored in one or more batteries, capacitors, and so on. Other techniques can be used to provide power to the gunshot sensor device. In a usage example, a gunshot sensor device can be coupled to a network using a wired connection such as an Ethernet™ connection. Power can be provided to the gunshot sensor device using a power over Ethernet™ (PoE) technique.

Figure 5:
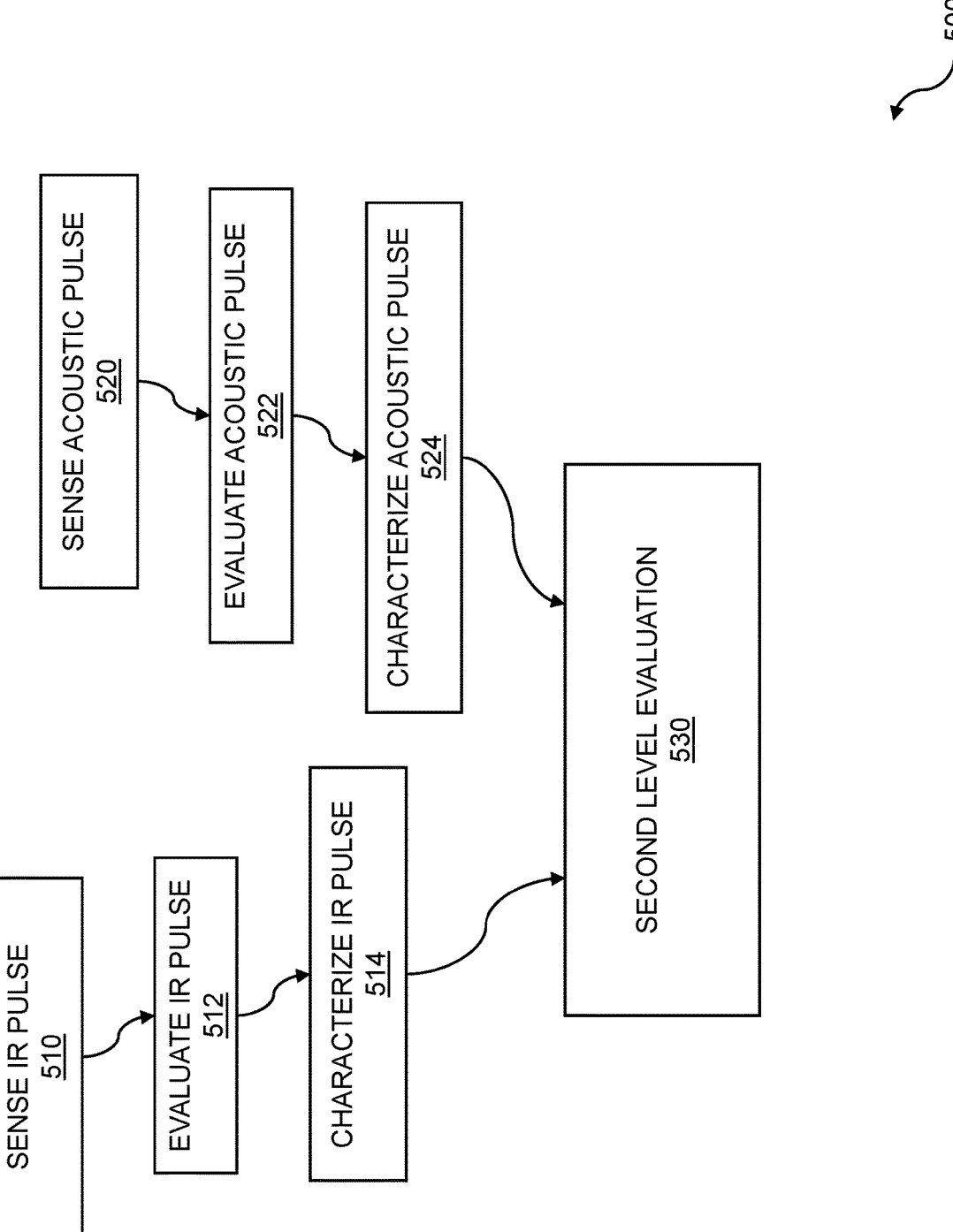
FIG. 5 is a logic flow diagram for signal analysis.

FIG. 5 is a logic flow diagram for signal analysis. The detection of a gunshot, the discrimination of a strobe event, and so on, can be accomplished using one or more signal analysis techniques. The signal analysis techniques can be applied to data including infrared data and acoustic data collected by a gunshot sensor device such as an outdoor sensor device. The signal analysis techniques enable single unit outdoor gunshot detection. Infrared information is collected using a gunshot sensor device, wherein the collecting infrared information is performed by at least two infrared sensors in a single gunshot sensor device unit, and wherein the infrared information is collected using near-infrared (NIR) band sensing. Acoustic information is collected using the gunshot sensor device, wherein the collecting acoustic information is performed by at least two acoustic sensors also in the single gunshot sensor device unit. A gunshot is detected using the gunshot sensor device, wherein the detecting is based on analysis of the infrared information and the acoustic information.

The flow 500 includes sensing an IR pulse 510. The IR pulse can include a near-IR pulse with a wavelength between 0.78 and 3 μm, a mid-IR pulse with a wavelength between 3 and 50 μm, and so on. In embodiments, the IR pulse has a duration ranging from about one millisecond to about twenty milliseconds. The duration of the IR pulse can vary depending on the firearm that produced the pulse. The flow 500 continues with evaluating the IR pulse 512. The evaluating can include determining peaks along different wavelengths within the range of IR acquisition. The flow 500 continues with characterizing the IR pulse 514. The characterizing can include identification of a particular peak and associating that peak with a known spectral signature from a firearm discharge. The flow 500 includes sensing an acoustic pulse 520. The acoustic pulse can include a shock wave having a characteristic "N" shape that originates from the projectile, and/or a sound wave that originates from the firearm. The flow 500 includes evaluating the acoustic pulse 522. This can include measuring a duration of the acoustic pulse. The flow 500 includes characterizing the acoustic pulse 524. The characterizing can include identifying a particular acoustic pulse and associating that acoustic pulse with a known acoustic signature from a firearm discharge. The flow 500 includes performing a second level evaluation

530. The second level evaluation comprises assembling results from one or more gunshot sensors. The flow 500 can comprise assembling results from the gunshot sensor along with a second gunshot sensor in a gateway device. The assembling can be accomplished independently of location for the gunshot sensor and location for the second gunshot sensor.

In embodiments, the assembling includes computation of a gunshot score, based on multiple sensor inputs. The sensor inputs can include shock wave detection, sound wave detection, and infrared detection. Furthermore, in embodiments, the gunshot score G is computed as $K_1 f_1(S) + K_2 f_2(I) + K_3 f_3(N)$, where S is the shock wave information, I is the infrared information, and N is the sound wave information. The function $f_1$ returns a value based on magnitude of the shock wave. The function $f_2$ returns a value based on the spectral signature of the infrared information. The function $f_2$ can include a correlation function and/or best fit function for an infrared signature resembling that which would result from firearm discharge. The function $f_3$ returns a value based on the magnitude of a sound wave. $K_1$, $K_2$, and $K_3$ are constants. The constants can be set to appropriately weight each of the three inputs. When the gunshot score S exceeds a predetermined level, a gunshot is deemed to have likely occurred. A gateway device can report this information to upstream systems such as campus security systems, law enforcement systems, and the like.

Figure 6:
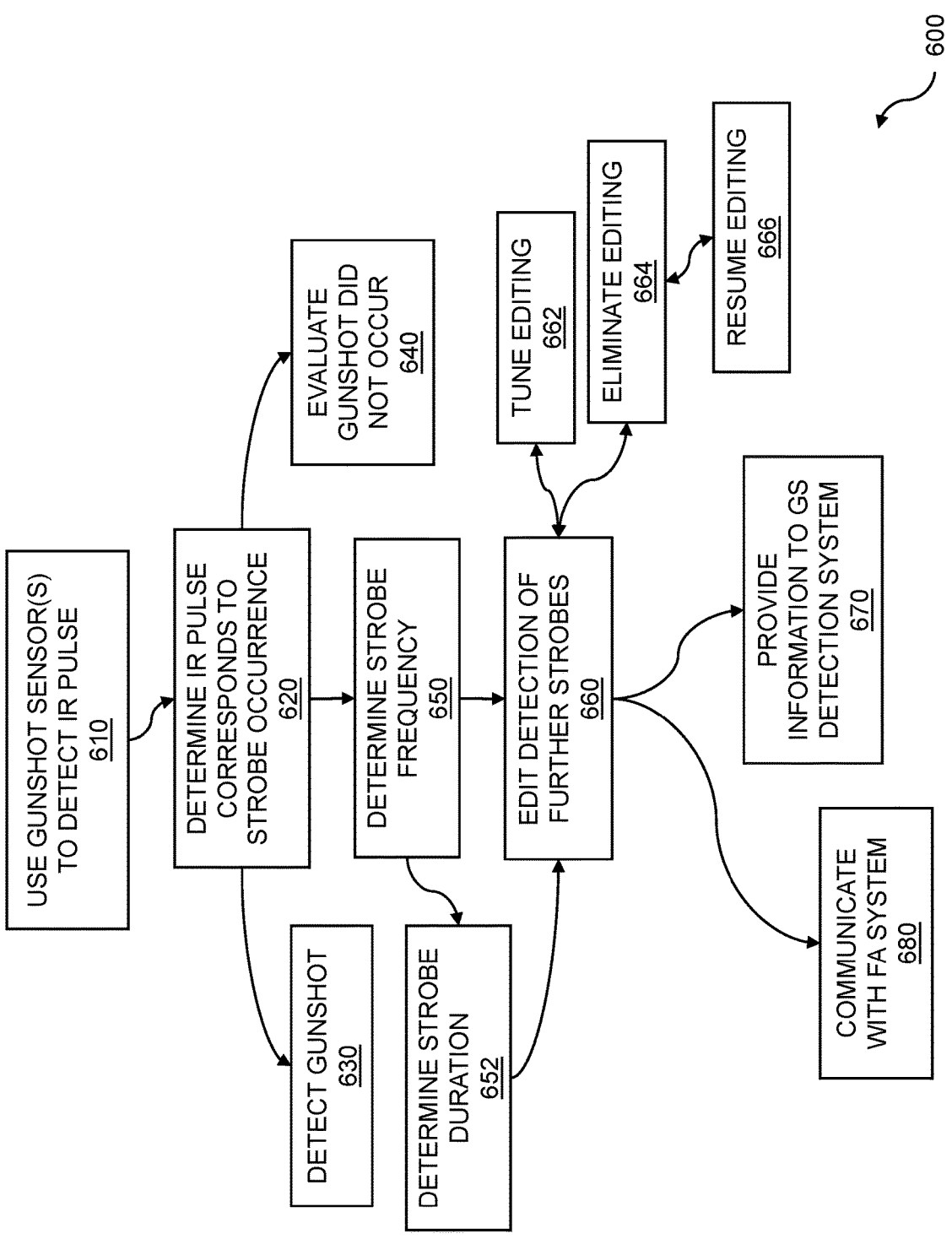
FIG. 6 is a flow diagram for gunshot analysis.

FIG. 6 is a flow diagram for gunshot analysis. Gunshot detection analysis can use a gunshot sensor device such as a single unit outdoor gunshot sensor device to detect an infrared pulse, where the gunshot sensor device can include three or more near-infrared (NIR) sensors. The infrared pulse can be determined to correspond to a strobe occurrence. Based on the strobe occurrence, a gunshot can be determined to have not taken place. A frequency of strobe occurrences can be determined, as can a duration for the strobes comprising the strobe occurrences. Editing detection can edit out a time window for sensing by the infrared sensors. The editing the strobe occurrences enables single unit outdoor gunshot detection. The flow 600 includes using one or more gunshot sensor devices to detect an infrared pulse 610, where the gunshot sensor device can include a MIR sensor, a NIR sensor, and an acoustic sensor. In embodiments, the gunshot sensor device includes other sensors such as a microphone, a visual sensor, etc. The gunshot sensor device can be placed in an outdoor location or within an indoor location. In embodiments, the gunshot sensor device is mounted on a wall, on a ceiling, etc., where the wall and/or the ceiling can be in an indoor room, a hallway, a common space such as a lounge or meeting room, and so on.

The flow 600 includes determining that the infrared pulse corresponds to a strobe occurrence 620. A fire alarm can include a strobe that produces a visible alert and a sounder that produces an alarm, codes, voice messages, etc. Thus, a strobe occurrence can comprise a fire alarm. When the fire alarm is activated, the alarm can produce visible strobes and can emit the alarm, codes, voice messages, etc. The fire alarm strobes can be produced at a frequency, and each strobe can have a duration. The light produced by the fire alarm strobe can include infrared light spectra, visible light spectra, and so on. The infrared spectra of the fire alarm strobe can be detected by the infrared sensor included in a gunshot sensor. The flow 600 includes evaluating that a gunshot did not occur 640 based on the strobe occurrence. As discussed above, an activated fire alarm can produce a visual alert in the form of a series of strobes, and an audio alert in the form of an alarm, codes, voice messages, etc. The fire alarm strobes can be detected by the gunshot sensor as infrared pulses. A gunshot produces an infrared pulse from a muzzle flash, and it also produces a high sound-pressure level (e.g., 120 dB to 160 dB) impulse. When a gunshot occurs, both an infrared pulse and a high sound-pressure level impulse are detected. Without the high sound-pressure level, the detected infrared pulse can be attributed to a strobe occurrence that can include a fire alarm strobe.

The flow 600 includes detecting a gunshot 630, while the fire alarm is occurring, based on information from the infrared sensor and the acoustic sensor. As previously stated, a gunshot event includes an infrared pulse and a high sound-pressure impulse. The coincidence in time of the infrared pulse and the high sound-pressure level pulse can be attributed to the gunshot. Since the gunshot emits an infrared pulse and a high sound-pressure level, and the fire alarm emits a sequence of light pulses, where the light pulses include infrared spectra, visible light spectra, etc., detecting a gunshot occurrence can be complicated. In some embodiments, the gunshot occurs at a different time from the strobe occurrence. The gunshot can be differentiated from the fire alarm strobe by the coincidence of an infrared pulse and a high sound-pressure level for the gunshot. For the fire alarm strobe, the acoustic sensor can sense an absence of an acoustic pressure wave that can correspond to a gunshot during a timeframe of the strobe occurrence (e.g., no bang, no gunshot). When a gunshot and a fire alarm strobe produce infrared impulses at substantially the same time, the gunshot cannot be differentiated from the fire alarm strobe. The strobe occurrence can interfere with gunshot detection evaluation because the two strobes can be detected as one infrared pulse, where the infrared pulse can coincide with the high sound-pressure level impulse.

The flow 600 includes determining a frequency of strobe occurrences 650. The determining of the frequency of strobe occurrences can be accomplished using various techniques, such as measuring a period of time between an infrared pulse and the next infrared pulse (seconds/cycle), and inverting the time period to determine frequency (cycles/second). Since the time periods between successive infrared pulses might not be equal, a time tolerance can be determined. The flow 600 includes determining a duration 652 for strobes within the strobe occurrences. The duration for strobes within the strobe occurrences can be determined using various techniques, such as the time difference between a pulse rise and a pulse fall, the time difference between the 50-percent point of a pulse rise and the 50-percent point of a pulse fall, and so on. Since the durations of successive infrared pulses might not be equal, a time tolerance associated with pulse duration can be determined.

The flow 600 includes editing detection of further strobe occurrences 660 based on the frequency of strobe occurrences. Detecting infrared pulses and high sound-pressure waves requires analysis to determine whether the infrared pulses were attributable to a fire alarm or a muzzle blast from a gunshot. Infrared pulses could be falsely tagged as gunshots, or worse, true gunshots could be missed and incorrectly tagged as fire alarm strobes. To reduce the analysis load, infrared pulses that correspond to strobe occurrences can be edited. Editing can include editing out a time window for sensing by the infrared sensor. By enabling the infrared sensor to ignore infrared pulses that correspond to the fire alarm strobe or strobes, the analysis can be reserved for detecting gunshots, tracking gunshots, etc. The editing can be performed based on the strobe frequency and based on the strobe duration. The flow 600 includes tuning the editing 662 as more information on the sequence of strobes is collected. The detection of additional infrared pulses can be used to detect pulse frequency, duration, and tolerance. As more pulses are detected, the editing can be tuned to track the fire alarm strobe occurrences more accurately. Tuning can include better predicting of the time of arrival of the next infrared pulse from the fire alarm strobe, minimizing duration of the editing to reduce the amount of time the infrared sensor detection is edited out, and so on. The flow 600 includes eliminating the editing 664 once the further strobe occurrences discontinue. Fire alarms can produce strobes and alarms, codes, voice messages, etc., for a period of time, and can then stop the strobes for a period of time. During the time that the strobes are not flashing, the editing can be eliminated or suspended, since any infrared pulse that can be detected during the absence of a fire alarm strobe can be a gunshot. The flow 600 includes resuming the editing 666 when further strobe occurrences resume. Just as fire alarms can stop producing strobes, the fire alarms can resume producing strobes. Since the strobes from a given fire alarm are likely to be produced with the same frequency, duration, and so on, as when previously produced, the editing can be substantially similar to the editing previously applied. Instead of re-computing pulse frequency, duration, tolerance, etc. from scratch, resuming the previous editing can permit the editing to resume more quickly and with less processing overhead.

The flow 600 includes providing information 670 to a gunshot detection system, from the gunshot sensor, that a fire alarm is occurring based on the strobe occurrence. The information can be used in modifying detection by other sensors based on the fire alarm occurring. As discussed above, a fire alarm can produce visual alerts in the form of strobes, and audio alerts in the form of alarms, codes, voice messages, and so on. The strobes include infrared light spectra and visible light spectra. By providing information to a gunshot detection system that a fire alarm is occurring, the gunshot detection system can be alerted that some infrared pulses should be attributed to strobe occurrences from a sequence of strobes. The gunshot detection system can begin detecting infrared pulses corresponding to strobe occurrences, editing strobe occurrences, etc. The flow 600 includes communicating between a fire alarm system and a gunshot detection system 680, including the gunshot sensor, so that the fire alarm system can provide a fire alarm notification to the gunshot detection system, and can further evaluate that a gunshot did not occur based on the fire alarm notification. Such communication can be used to enhance the discrimination between fire alarm strobes and gunshot events. The communication can be used to indicate that editing is necessary, to initiate editing, to control editing (e.g., infrared pulse frequency, duration, tolerance, etc.), and so on. Various steps in the flow 600 may be changed in order, repeated, omitted, or the like without departing from the disclosed concepts. Various embodiments of the flow 600 can be included in a computer program product embodied in a non-transitory computer readable medium that includes code executable by one or more processors. Thus, disclosed embodiments comprise evaluating strobe occurrence, based on the infrared information and the acoustic information, and using the strobe occurrence to provide gunshot false alert detection.

Figure 7:
FIG. 7 is a flow diagram for second strobe evaluation.
Figure 7:
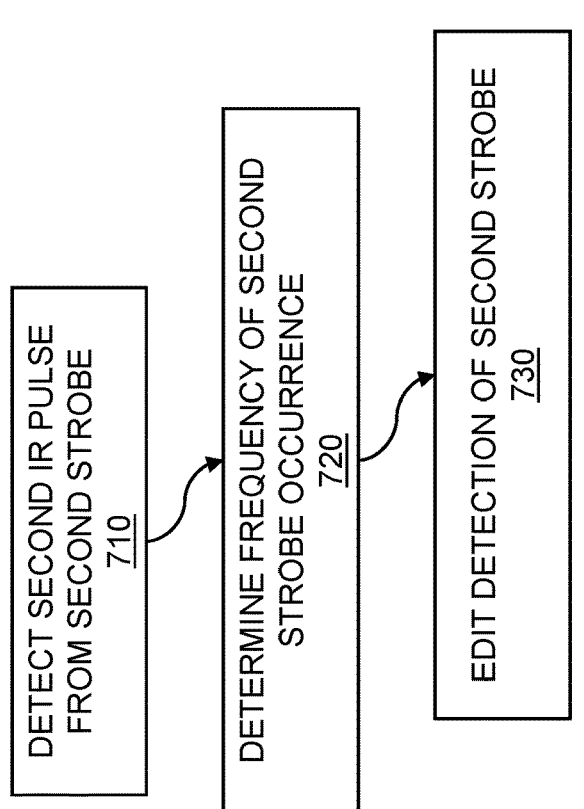

FIG. 7 is a flow diagram for second strobe evaluation. The flow 700 can continue from or be part of the previous flow 600. The second strobe evaluation can enable single unit outdoor gunshot detection. The flow 700 includes detecting a second infrared pulse corresponding to a second sequence of strobes 710. The second infrared pulse can be detected with a mid-infrared sensor (MIR), a near-infrared sensor (NIR), or both. The second sequence can emanate from a second strobe source. In certain configurations, a given gunshot detection device can have a line of sight to a plurality of fire alarms. Since fire alarms typically include strobes and sounders, the flashing of the one or more fire alarm strobes can produce infrared pulses that can be similar to infrared pulses generated by muzzle flashes from firearms. As was the case for the first sequence of strobes, the second sequence of strobes can be detected by the MIR and NIR infrared sensors included in a gunshot sensor device. The infrared pulses that result from the second sequence of strobes can be similar to the infrared pulses from the first sequence of strobes. The infrared pulses resulting from the second sequence of strobes can differ from the infrared pulses from the first subsequence of strobes with regard to frequency of the strobes, intensity (magnitude) of the strobes, etc.

The flow 700 includes determining a frequency of strobe occurrence for the second sequence of strobes 720. A time period between a first strobe occurrence for the second sequence of strobes and a second strobe occurrence for the second sequence of strobes can be determined. By inverting the time period, the frequency of strobe occurrence for the second sequence of strobes can be calculated. The duration of strobe occurrence for a given strobe occurrence for the second sequence of strobes can also be determined. The duration of strobe occurrence can be determined based on a time difference between pulse rise time and pulse fall time, the time difference between a 50-percent point in a pulse rise and a 50-percent point in a pulse fall, and so on.

The flow 700 includes editing detection of a second set of further strobe occurrences 730 based on the frequency of a second sequence of strobes. As was the case for the first sequence of strobe occurrences, editing detection can occur for the second sequence of strobes. Editing detection can edit out a time window for sensing by the infrared sensor of a gunshot sensor. During the time window that is edited out, the infrared sensor can ignore infrared pulses that can be associated with a second fire alarm strobe. The time window that is edited out can be less than or equal to four percent of a time period between strobe occurrences of the second sequence of strobes. In embodiments, the frequencies for the first and second sequences of strobes are substantially similar. When the frequencies for the strobe occurrences of the first and second sequences of strobes are substantially similar, the infrared sensor can regard the two fire alarm pulses as one pulse, as a pulse wider than a pulse from a single strobe, and so on. In further embodiments, frequencies for first and second strobe sequences are different. When the frequencies for the strobe occurrences of the first and second sequences of strobes are different, then the two sequences of strobes can be detected, where each sequence of strobes has its own frequency and duration. The editing detection can edit out time windows for sensing by the infrared sensor based on the multiple strobe frequencies and the multiple strobe durations. This concept can be extended to three, four, or more strobe sources with corresponding frequencies, durations, and editing. Various steps in the flow 700 may be changed in order, repeated, omitted, or the like without departing from the disclosed concepts. Various embodiments of the flow 700 can be included in a computer program product embodied in a non-transitory computer readable medium that includes code executable by one or more processors.

Figure 8:
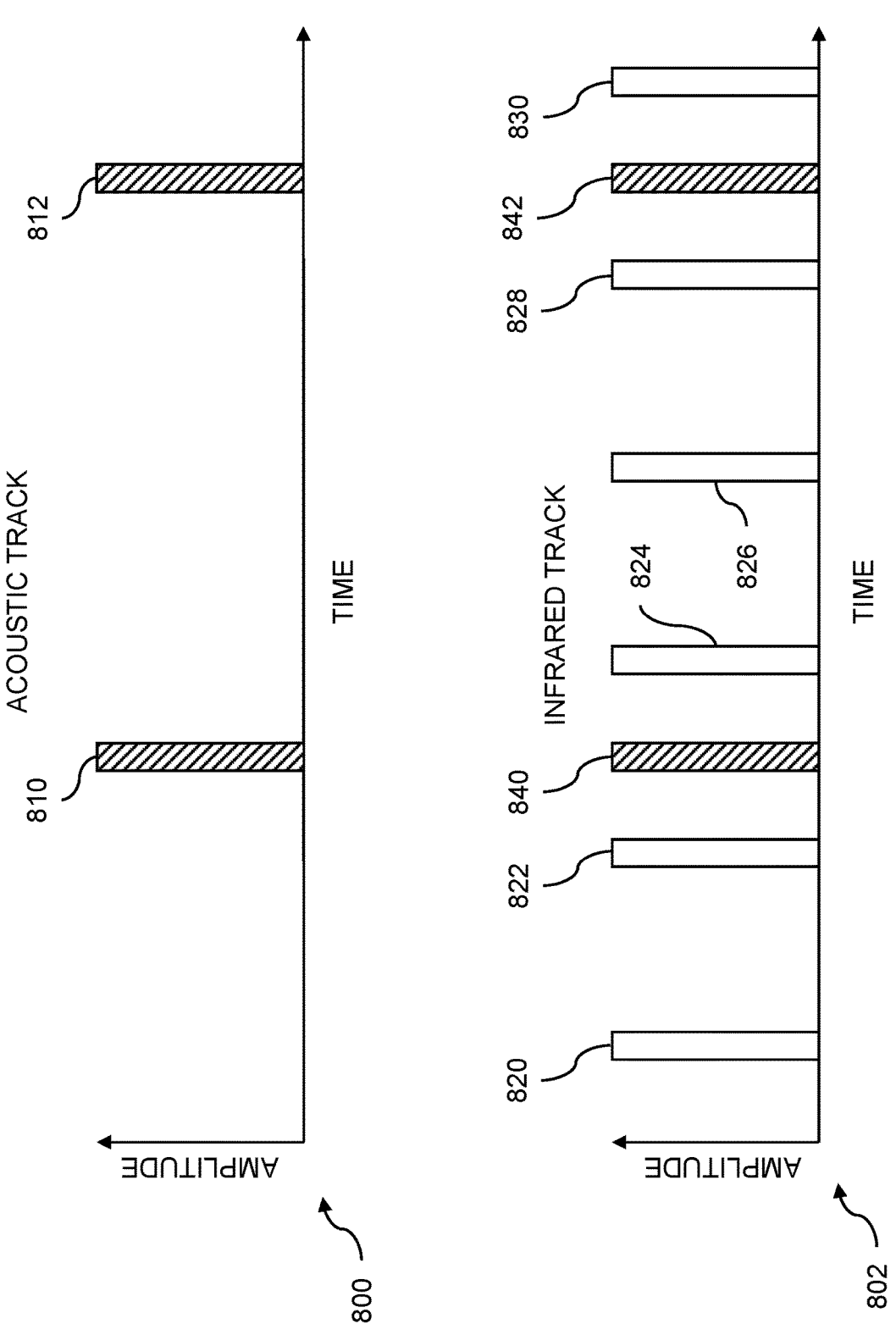
FIG. 8 illustrates acoustic and infrared tracks.

FIG. 8 illustrates acoustic and infrared tracks. As stated above, a gunshot sensor device includes three or more near-infrared sensors and three or more acoustic sensors. In the event of a gunshot, the gunshot detection device can detect an infrared pulse and an acoustic pulse. The one or more infrared sensors can detect an optical flash, a thermal flash, etc., at the muzzle of a firearm, and the acoustic sensor can detect a muzzle blast associated with the optical flash. The acoustic sensor might also detect a shock wave that occurs when the projectile that is expelled from the firearm is traveling at supersonic velocities. For a gunshot event, both an infrared event and an acoustic event can occur; however, the acoustic event may only comprise a muzzle blast sound and not a shock wave. In some embodiments, only a silenced or highly attenuated sound occurs. Detecting infrared and acoustic tracks can be accomplished using a single unit outdoor gunshot detector. Infrared information is collected using a gunshot sensor device, wherein the collecting infrared information is performed by at least two infrared sensors co located in a single gunshot sensor device unit, and wherein the infrared information is collected using near-infrared (NIR) band sensing. Acoustic information is detected using the gunshot sensor device, wherein the collecting acoustic information is performed by at least two acoustic sensors also in the single gunshot sensor device unit. A gunshot is detected using the gunshot sensor device, wherein the detecting is based on analysis of the infrared information and the acoustic information.

An example acoustic track 800 is shown. In the event of one or more gunshot events, the acoustic sensor can detect high sound-pressure level waves 810 and 812. An impulse can result for each gunshot event that occurs. An infrared track 802 is shown. Infrared pulses can result from a high intensity light strobe such as the strobe coupled to a fire alarm. Such pulses corresponding to a strobe occurrence can include pulses 820, 822, 824, 826, 828, and 830. Infrared pulses can result from an optical flash at the muzzle of a firearm. Such pulses corresponding to an optical flash can include pulses 840 and 842. The infrared track 802 shows that infrared pulses alone might not distinguish between a strobe occurrence and an optical flash. A gunshot can be detected, while the fire alarm is occurring, based on information from the infrared sensor and the acoustic sensor. As shown by the tracks 800 and 802, the overlap between the acoustic track pulses such as 810 and 812 and the infrared track pulses such as 840 and 842 can be associated with one or more gunshots. The coincidence of the acoustic track pulses and the infrared track pulses can be used to detect a true gunshot when the gunshot occurs within a timeframe which is different from the strobe occurrence timeframe. If the pulses are coincident, then the detected infrared pulse is likely a gunshot. In this example, the acoustic sensor can sense a presence of an acoustic pressure wave corresponding to a gunshot during a time window between the strobe occurrences.

Figure 9:
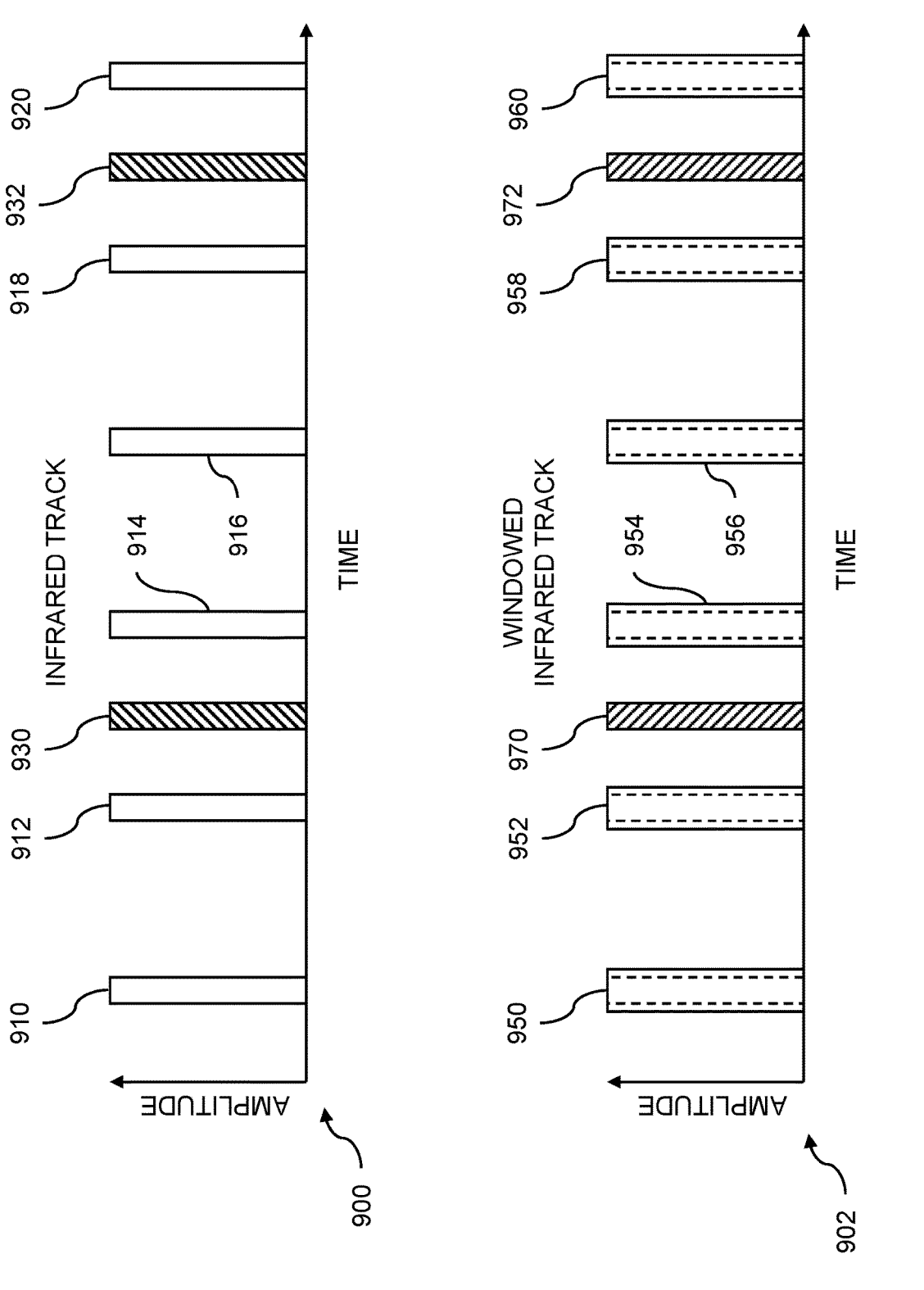
FIG. 9 shows infrared and windowed infrared tracks.

FIG. 9 shows infrared and windowed infrared tracks. Gunshot detection analysis can use a gunshot sensor device such as an outdoor gunshot sensor device to detect an infrared pulse, where the gunshot sensor device can include three or more near-infrared sensors and three or more acoustic sensors. The infrared pulse can be determined to correspond to a strobe occurrence. A gunshot can be evaluated to have occurred based on infrared pulse detection transpiring between strobe occurrences. A frequency of strobe occurrences can be determined, as can a duration for the strobes within the strobe occurrences. Editing detection can edit out a time window for sensing by the infrared sensor. The windowed infrared tracks enable single unit outdoor gunshot detection. An infrared track 900 is shown. As time progresses, a train of infrared pulses at the same amplitude or at differing amplitudes can occur, where the pulses can correspond to strobe occurrences from a strobe. The strobe can be associated with an ongoing fire alarm. In the example 900, using a gunshot sensor to detect an infrared pulse can detect an infrared pulse corresponding to a strobe. The strobe occurrence can be part of a sequence of strobes. Pulses 910, 912, 914, 916, 918, and 920 can correspond to such a sequence of strobes. An infrared pulse can correspond to one or more gunshots, represented by pulses 930 and 932. A frequency of strobe occurrences can be determined by detecting a train of pulses, determining the period between pulses, and inverting the period to find frequency. The duration of strobes within the strobe occurrences can be determined. The duration of strobes can be determined by calculating the time difference between the time at which a pulse rises and the time at which a pulse falls. Pulse duration can be measured between the 50-percent points of the rising waveform and the falling waveform, etc.

By determining a frequency and duration of strobe occurrences for a sequence of strobes, editing detection of the set of strobe occurrences can take place. The editing detection is based on the frequency and duration of the sequence of strobes. A windowed infrared track 902 is shown. The editing detection edits out a time window for sensing by the infrared sensor. During the edited time window, pulses resulting from infrared signals detected by the gunshot detector can be ignored. By ignoring signals, processing and analysis resources can be reserved for analyzing other signals that have not yet been identified, or signals that have been identified and are being tracked. The edited time window can be less than or equal to four percent of a time period between strobe occurrences. The small, edited time window can avoid missing infrared pulses that might actually be gunshots. Based on the frequency of strobe occurrence for the sequence of strobes, or pulses, 910, 912, 914, 916, 918, and 920, the strobes from the sequence can be edited as strobes, represented by pulses 950, 952, 954, 956, 958, and 960. Since the infrared pulses 930 and 932 can correspond to gunshot events, the pulses 930 and 932 can be left unedited as pulses 970 and 972, respectively. That is, the unedited pulses such as infrared pulse 970 can occur within a time window, such that when an unedited pulse is detected, the unedited infrared pulse can be determined to be coincident with an acoustic pulse (not shown) when accounting for the difference in the propagation speeds of light and sound. In some embodiments, the fire alarm(s) communicate an activated status to a gateway, which then conveys the information to the gunshot sensors. The communication can include information pertaining to the fire alarm buzzer and/or strobe pattern. In response, the gunshot sensors can perform the aforementioned windowing based on the information conveyed from the fire alarm(s).

Figure 10:
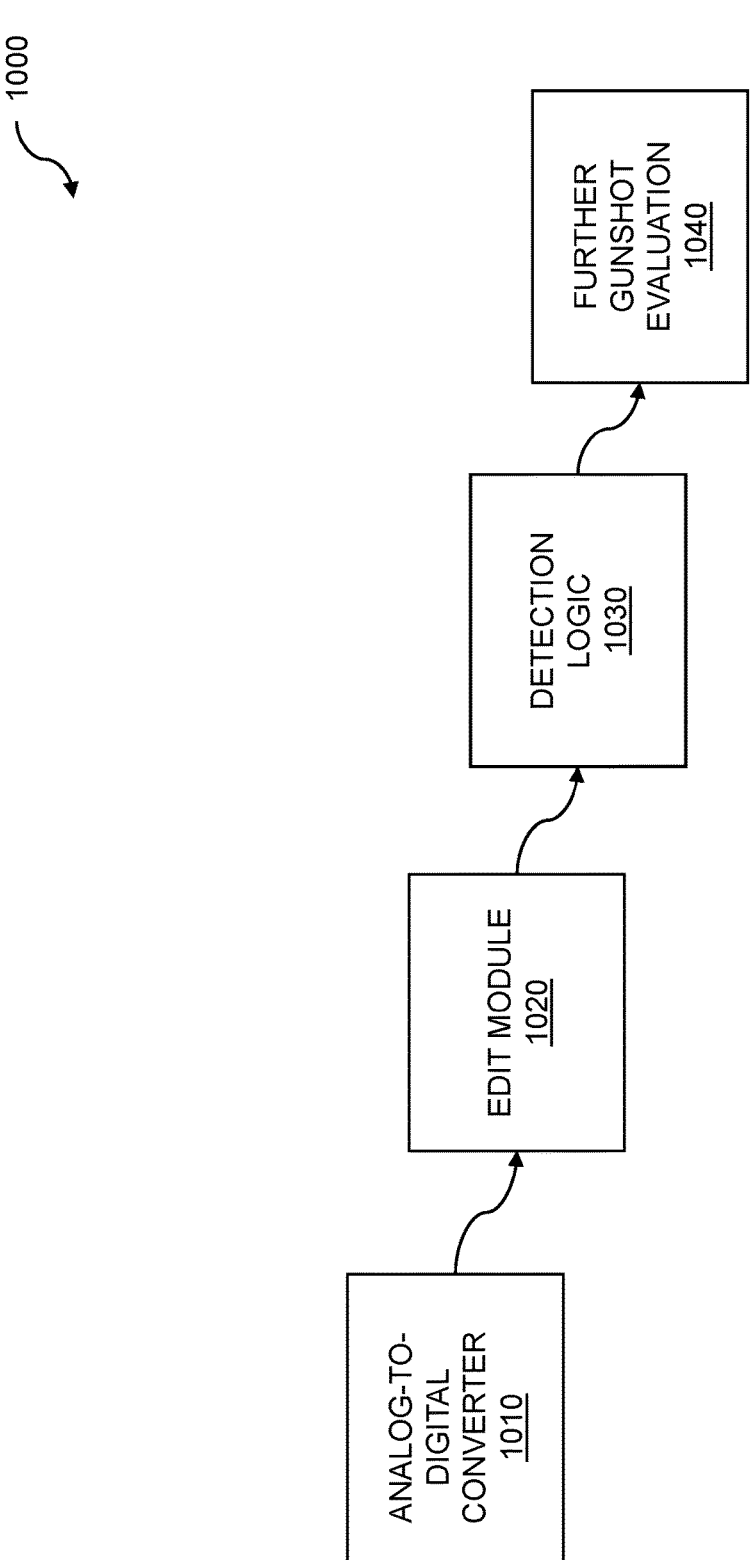
FIG. 10 illustrates signal editing components.

FIG. 10 illustrates signal editing components. Gunshot detection analysis can use a gunshot sensor device such as a single unit outdoor gunshot sensor device to detect an infrared pulse. The gunshot sensor device can include three or more near-infrared (NIR) sensors. The gunshot sensor device can further include three or more acoustic sensors. The signal editing components can be used to mask or edit out periodic signals such as periodic IR signals received from a strobe associated with a fire alarm. The example 1000 shows signal editing components for low power gunshot detection analysis, where the analysis can take place with an ongoing fire alarm. The signal editing components can be included in a gunshot sensor device or can be external to the gunshot sensor device. The signal editing components can be implemented in hardware, software, or a combination thereof. The signal editing components can include one or more processors and software to configure the one or more processors. The signal editing components can be implemented with integrated circuits, programmable or configurable devices such as field programmable gate arrays (FPGAs), custom or specialty chips such as application specific integrated circuits (ASICs), cloud-based components or systems, and so on. The gunshot sensor device can include an analog-to-digital converter 1010 and logic to perform gunshot detection. The analog-to-digital converter 1010 can be interposed between the one or more infrared sensors and the logic. The logic can be edit logic, where the edit logic can edit out spurious or other unwanted signals such as fire alarm strobes (discussed below). The analog-to-digital converter can operate on the pulses, such as MIR and NIR pulses received from the infrared sensor or sensors, and can operate on the impulses received from the acoustic sensor or sensors. The analog-to-digital converter can perform various operations including pulse detection, filtering, determining pulse frequency, determining pulse duration, and so on.

The analog-to-digital converter can be coupled to an edit module 1020. As previously stated, editing can include editing detection, where editing detection can edit out a time window for sensing by the one or more infrared sensors. The editing can be based on a frequency of strobe occurrences, on a duration of strobes within the strobe occurrences, and so on. The editing detection can be accomplished between the analog-to-digital converter and the logic to perform gunshot detection. The signal editing components can include detection logic 1030. The detection logic 1030 can be coupled to the edit module 1020. The logic to perform gunshot detection can include one or more processors, as well as software to configure the one or more processors to perform the gunshot detection. The gunshot detection can include determining that a given infrared pulse corresponds to a strobe occurrence and can evaluate whether a gunshot did or did not occur. The detection technique can be edited. The editing detection can be accomplished by the one or more processors based on software to configure the processors to perform the editing. The editing detection can include loading software, where the software can be coded to implement a variety of algorithms, heuristics, and so on. The editing can be performed before the gunshot detection. The editing can include filtering, signal shaping, scaling, attenuation, discrimination, anti-aliasing, cross-correlation, and so on. The signal editing components can include further gunshot evaluation 1040. The further gunshot evaluation component 1040 can be coupled to the detection logic 1030. The further gunshot evaluation can include detecting a gunshot with an ongoing fire alarm, detecting a gunshot with multiple ongoing fire alarms, detecting multiple gunshots, etc. The further gunshot evaluation can include identifying weapons, identifying shooters, tracking shooters, notifying emergency services or law enforcement, and so on. Various embodiments of the example 1000 illustrating signal editing components can be included in a computer program product embodied in a non-transitory computer readable medium that includes code executable by one or more processors.

Figure 11:
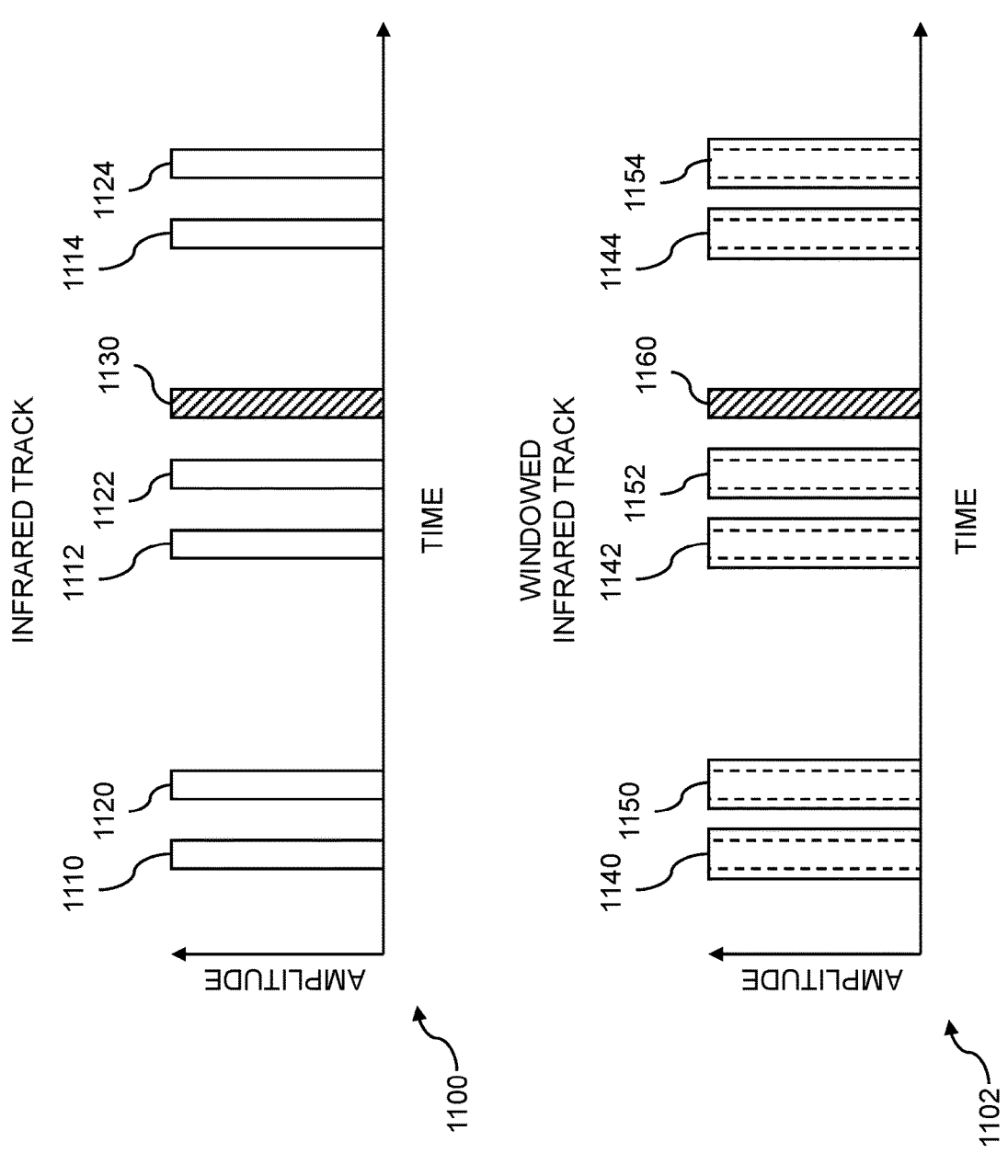
FIG. 11 shows editing for multiple strobes.

FIG. 11 shows editing for multiple strobes. The presence of multiple IR flashes such as periodic strobes associated with a fire alarm can obfuscate detection of flash such as a muzzle flash. Detection of the muzzle flash can be enhanced by editing out the periodic flashes. The editing out the multiple flashes can be accomplished by editing out multiple time windows of data received from sensing by an infrared sensor. An infrared track 1100 is shown. As time progresses, a train of infrared pulses at the same amplitudes or at differing amplitudes can occur, and the pulses can correspond to strobe occurrences from one or more strobes such as fire alarm strobes. The infrared pulses can be based on one or more designations of infrared light such as near-infrared, mid-infrared, and so on. The buffering can be based on buffering NIR information and using the buffered information to filter spurious infrared information. The editing for multiple strobes enables low power gunshot detection by a single unit outdoor gunshot detection unit. In track 1100, using a gunshot device to detect an infrared pulse can detect a second infrared pulse corresponding to a second sequence of strobes. The gunshot sensor device can include a mid-infrared (MIR) sensor, a near-infrared (NIR) sensor, and so on. Pulses 1110, 1112, and 1114 can correspond to strobe occurrences of a first strobe, and pulses 1120, 1122, and 1124 can correspond to strobe occurrences of a second strobe. In practice, any number of strobe occurrences can be present. An infrared pulse can correspond to a gunshot, represented by pulse 1130. As was the case for a single strobe, where a frequency of strobe occurrences for the first sequence of strobes was determined, a frequency of strobe occurrences for the second sequence of strobes can also be determined. The results of determining a frequency of strobe occurrences, for a second sequence of strobes, can be editing detection of a second set of further strobe occurrences, based on the frequency of second sequence of strobes. A windowed infrared track 1102 is shown. Based on the frequency of strobe occurrence for the first sequence of strobes, represented by pulses 1110, 1112, and 1114, the strobes from the first sequence can be edited to pulses 1140, 1142, and 1144, respectively. Similarly, based on the frequency of strobe occurrence for the second sequence of strobes, represented by pulses 1120, 1122, and 1124, the strobes from the second sequence can be edited to pulses 1150, 1152, and 1154, respectively. Since the infrared pulse 1130 can correspond to a gunshot event, the pulse 1130 can be left unedited as pulse 1160.

Editing detection can be based on the frequencies and durations of sequences of strobe occurrences. Editing detection to edit out a time window for sensing, by the infrared sensor device, infrared pulses corresponding to both the first and second sequences of strobe occurrence, can be dependent not only on the frequencies of the first sequence of strobe occurrences and the second sequence of strobe occurrences, but also on the durations of each sequence of strobe occurrences and the separation between the two sequences. Frequencies for the strobe occurrences and the second sequence of strobes can be substantially similar. Differentiating between the two sequences can be complex since it can be difficult to differentiate between the beginning of one pulse in one sequence and the ending of another pulse in another sequence. When the pulse frequencies are substantially similar, the editing can be accomplished by increasing the value of the duration for strobes within the first sequence of strobe occurrences, such that the increased duration value covers both the first sequence of strobe occurrences and the second sequence of strobe occurrences. However, frequencies for the strobe occurrences and the second sequence of strobes can also be different. In this latter case, detection of strobe occurrences of the first sequence of strobes and detection of strobe occurrences of the second sequence of strobes can differentiate between the two sequences of strobes. The widths of the editing windows can thus be determined individually based on the durations of the two sequences of pulses.

Figure 12:
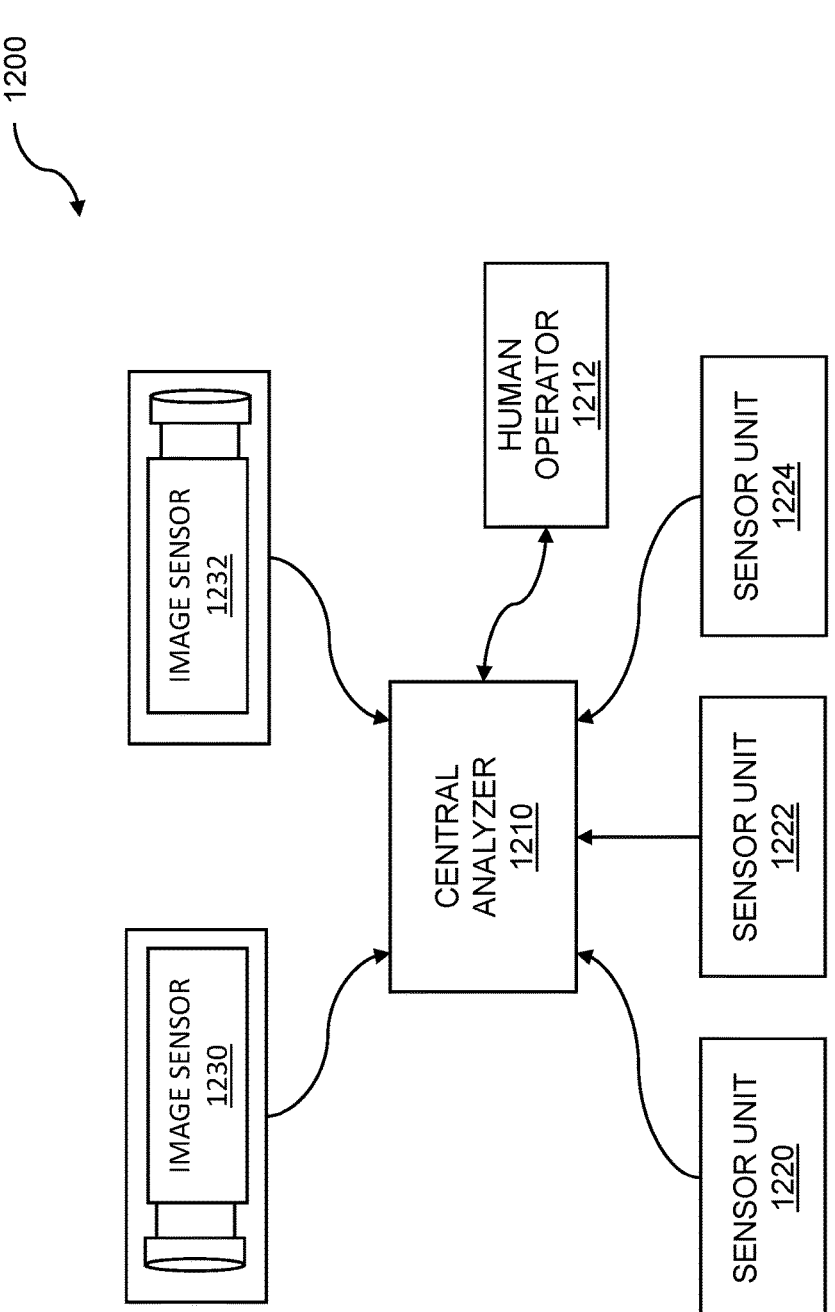
FIG. 12 is an example system illustrating sensors, cameras, and a central analyzer.

FIG. 12 is an example system illustrating sensors, cameras, and a central analyzer. Single unit outdoor gunshot detection can be based on infrared information and acoustic information, where both types of information can be obtained in an outdoor environment. The infrared information can include IR information that includes various wavelengths, such as near-infrared, mid-infrared, far-infrared, and so on. Video collection can be engaged based on the detecting of the gunshot. Video analytics can be performed for tracking a suspected shooter associated with the gunshot using the collected video. An audio microphone can be activated based on the detection of the gunshot. The tracking of the shooter can be further based on the audio microphone that can be activated. Sensors, cameras, and a central analyzer can be used for single unit outdoor gunshot detection with components of a system 1200. A central analyzer 1210 can be used for a single unit outdoor detection system. The central analyzer can control the one or more sensor units and image sensors. The central analyzer can be used to detect a gunshot, engage video collection, and perform video analytics. The central processor can interact with a human operator 1212. The human operator can interact with the central analyzer to provide oversight. The human operator can tag a person of interest. The tagging by the human operator can be used along with video analytics for tracking the person of interest. The central analyzer can be coupled to a plurality of gunshot sensor units 1220, 1222, and 1224, a plurality of image sensors 1230 and 1232, and so on. The gunshot units can include sensors for mid-infrared (MIR) information, near-infrared (NIR) information, and high acoustic level information. The central analyzer can obtain infrared information including MIR and NIR information, and acoustic information, from the sensor units. The central analyzer can be coupled to image sensors 1230 and 1232. The image sensors can be engaged by the central analyzer. The image sensors that can be used can include video cameras, still cameras, or other digital image collection systems and techniques. The central analyzer can perform video analytics, where the video analytics utilize image classifiers. The image classifiers can be used to identify a firearm type. A suspected shooter can be identified based on the video analytics. As mentioned above, with oversight from the human operator 1212, where the operator can tag a person of interest, tracking of the person of interest can be conducted using video analytics performed by the central analyzer.

Figure 13:
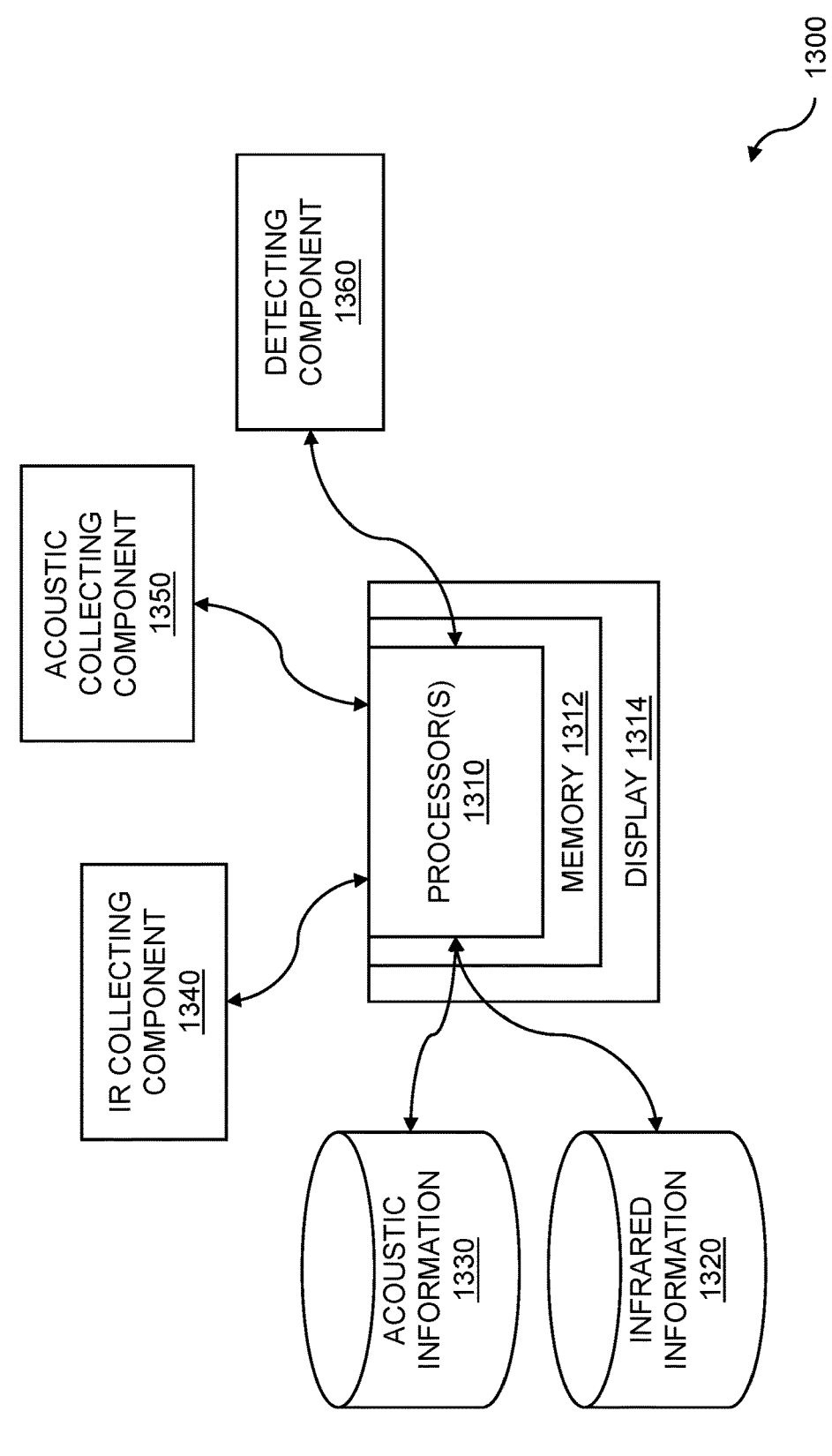
FIG. 13 is a system diagram for single unit outdoor gunshot detection.

FIG. 13 is a system diagram for single unit outdoor gunshot detection. The system 1300 can include a single gunshot sensor unit used for gunshot analysis, wherein the gunshot sensor unit comprises: at least two infrared sensors in a single gunshot sensor device unit, wherein the at least two infrared sensors collect infrared information using near-infrared (NIR) band sensing; at least two acoustic sensors in the single gunshot sensor device unit; an analysis device, coupled to the at least two infrared sensors and the at least two acoustic sensors, wherein the analysis device comprises at least one processing element; a communication device, coupled to the analysis device, wherein the communication device provides notification of gunshot detection, based on an output from the analysis device; and a power source, with the single gunshot sensor device unit, wherein the power source energizes the infrared sensors, the acoustic sensors, the analysis device, and the communication device. NIR signal information received by the at least two IR sensors can include spurious high-power IR information due to a strobe from a fire alarm. Buffering or a similar technique can be used for filtering out a strobe, if present, or other spurious information. Other filtering applications can include high-level ambient light, direct sunlight, high intensity lamps, safety lighting, search light filtering, etc. The high-level ambient light can include high-intensity infrared information from an ongoing fire alarm strobe light. The system 1300 can include one or more processors 1310 coupled to a memory 1312 which can store and retrieve instructions and data, and a display 1314. The display can be used to show acoustic information, infrared information, corresponding information, matching information, and so on. The display can be used to show notification information.

The system 1300 can include a collection of infrared information 1320. The infrared information can include IR information collected using a using a single unit outdoor gunshot sensor device. The IR information can include IR information collected from a potential gunshot event or spurious IR information from high-intensity IR pulses such as from a fire alarm, lightning flashes, high-level ambient light, etc. The IR information can include IR test information, IR calibration information, and the like. The IR information can include MIR and NIR information. The collection of infrared information can include archived or historical information, buffered information, and so on. The system 1300 can include a collection of acoustic information 1330. The acoustic information can include acoustic information collected using the single unit outdoor gunshot sensor device, information collected within an indoor environment, or both. The acoustic event can include acoustic information collected from a potential gunshot event, fireworks, an explosion, a high intensity acoustic event such as an alarm or car horn, a vehicle backfire, and the like. The high intensity acoustic event can include a naturally occurring acoustic event such as thunder, an earthquake, etc. The acoustic information can include other acoustic information such as acoustic signatures for various types of acoustic events, acoustic test information, acoustic calibration information, and so on. The collection of acoustic information can include archived or historical information, buffered information, etc.

The system 1300 can include an IR collecting component 1340. The IR collecting component can collect infrared information using a gunshot sensor device. In embodiments, the collecting infrared information is performed by at least two infrared sensors in a single gunshot sensor device unit. The infrared information is collected using near-infrared (NIR) band sensing. The IR information that is collected can be based on various categories of IR light sensing such as near-infrared (NIR) band light with wavelengths between 0.76-3 μm; mid-infrared (MIR) band light with wavelengths between 3-50 μm; far-infrared (FIR) band light with wavelengths between 50-1000 μm, etc. The collecting of the infrared information 1320 can occur using the one or more processors 1310, or can occur using other processors. The collecting of the infrared information 1320 can be accomplished using a cable-free access to a wired or wireless computer network, a wired or wireless sensor network, the Internet, and so on. The infrared information 1320 can be collected within the outdoor environment using the gunshot sensor device, where the infrared information can be buffered within the gunshot sensor device. The infrared information can be collected from a plurality of infrared sensors including NIR and MIR sensors. The infrared sensors can be pointed in different directions to cover various fields of view.

The system 1300 can include an acoustic collecting component 1350. The acoustic collecting component can collect acoustic information using the gunshot sensor device. In embodiments, the collecting acoustic information is performed by at least two acoustic sensors also in the single gunshot sensor device unit. The collecting of the acoustic information 1330, can occur using the one or more processors 1310, or can occur using other processors. The collecting of the acoustic information 1330 can be accomplished using a cable-free access to a wired or wireless computer network, a wired or wireless sensor network, the Internet, and so on. The acoustic information 1330 can be collected within an outdoor environment using the gunshot sensor device, where the gunshot sensor device can use low power gunshot detection and where the gunshot sensor device can be powered by a solar panel, power over Ethernet (POE), etc. The acoustic information can be collected using at least two acoustic sensors such as microphones, transducers, etc. The acoustic sensors can be attenuated so that only high intensity acoustic events can be detected. The acoustic sensors can be configured so that they cannot detect voices.

The system 1300 can include a detecting component 1360. The detecting component can use the gunshot sensor device to detect IR events, acoustic events, and so on. In embodiments, the detecting can be based on analysis of the infrared information and the acoustic information. The detecting can include determining a high-intensity flash such as a muzzle flash, a high-intensity sound such as a muzzle blast or gunshot sound, and so on. In embodiments, the analysis of the infrared information and the acoustic information can include making a correspondence between a gunshot sound and an infrared event that occurred in time before the gunshot sound. The detecting can be performed in hardware or software. In embodiments, the detecting can include monitoring the acoustic information to identify a high-intensity gunshot sound. In embodiments, the NIR band sensing provides gunshot muzzle flash detection. The detecting can be based on a comparison of the collected infrared and acoustic information to known signature data from firearm discharge. For example, a library of various signatures from firearms of different types can be stored within system 1300. As part of detecting, the detecting component 1360 can compare acquired information from the gunshot sensor device to data in a library of gunshot sounds to determine if the acquired information pertains to a gunshot, and possibly to indicate a firearm model and/or type that was used to create the gunshot. The detecting can include establishing a temporal correspondence between the gunshot sound and an infrared event that occurred in time before the gunshot sound. The infrared event can be detected in time before the gunshot sound, as light travels faster than sound. Further, the sound may reverberate off hard surfaces within an indoor environment or an outdoor environment, which can cause multiple acoustic information detections due to multipath collection. Further embodiments can include notifying the network of a possible gunshot occurrence, based on the detecting. The notifying the network can use information collected from other gunshot sensor devices to identify a location associated with the detected gunshot. The notifying can use the gunshot sensor device to notify the network of a possible gunshot occurrence. The notifying of the network can be based on cable-free techniques, where the cable-free communication to a network can include wireless communication. The network can include a wireless network such as a computer network based on Wi-Fi™, a local network based on Bluetooth™, Zigbee™, infrared, or other wireless techniques or standards. The network can include a wired network such as the Internet or other computer network, a hybrid network based on wireless and wired techniques, and so on. In embodiments, the notifying can be based on an analysis of a high-intensity gunshot sound and an NIR event that were detected. The analysis can be performed locally, remotely, and so on. In embodiments, the analysis can be performed by the gunshot sensor device. Further embodiments can include periodic excursions to a higher-power mode by the gunshot sensor device, where the higher-power mode enables cable-free communication to a network of the sensor's health data to a gunshot detection gateway. By performing periodic excursions to a higher-power mode, battery life can be significantly extended. In other embodiments, the detecting a gunshot activates a video monitoring device. The video monitoring device can remain inactive, in a low-power mode, and the like, to maintain privacy of individuals occupying spaces at times other than during gunshot events. The video monitoring can provide a "live" video feed to security, law enforcement, emergency services, military, or other personnel who may be activated during a gunshot event.

The system 1300 can include a computer system for gunshot analysis comprising: a memory which stores instructions; one or more processors coupled to the memory wherein the one or more processors, when executing the instructions which are stored, are configured to: collect infrared information using a gunshot sensor device, wherein the collecting infrared information is performed by at least two infrared sensors in a single gunshot sensor device unit, and wherein the infrared information is collected using near-infrared (NIR) band sensing; collect acoustic information using the gunshot sensor device, wherein the collecting acoustic information is performed by at least two acoustic sensors also in the single gunshot sensor device unit; and detect a gunshot using the gunshot sensor device, wherein the detecting is based on analysis of the infrared information and the acoustic information.

The system 1300 can include a computer program product embodied in a non-transitory computer readable medium for gunshot analysis, the computer program product comprising code which causes one or more processors to perform operations of: collecting infrared information using a gunshot sensor device, wherein the collecting infrared information is performed by at least two infrared sensors in a single gunshot sensor device unit, and wherein the infrared information is collected using near-infrared (NIR) band sensing; collecting acoustic information using the gunshot sensor device, wherein the collecting acoustic information is performed by at least two acoustic sensors also in the single gunshot sensor device unit; and detecting a gunshot using the gunshot sensor device, wherein the detecting is based on analysis of the infrared information and the acoustic information.

Embodiments include an apparatus for gunshot analysis comprising: infrared sensors in a single gunshot sensor device unit, wherein the at least two infrared sensors collect infrared information using near-infrared (NIR) band sensing; at least two acoustic sensors in the single gunshot sensor device unit; an analysis device, coupled to the at least two infrared sensors and the at least two acoustic sensors, wherein the analysis device comprises at least one processing element; a communication device, coupled to the analysis device, wherein the communication device provides notification of gunshot detection, based on an output from the analysis device; and a power source, with the single gunshot sensor device unit, wherein the power source energizes the infrared sensors, the acoustic sensors, the analysis device, and the communication device.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Disclosed embodiments are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for gunshot analysis comprising:

collecting, by one or more infrared sensors of a gunshot sensor device, infrared information in a near-infrared (NIR) band;

collecting, by one or more acoustic sensors of the gunshot sensor device that are co-located in a gunshot sensor device unit with the one or more infrared sensors, acoustic information; and detecting a gunshot using the gunshot sensor device based on analysis of the infrared information and the acoustic information.

2. The method of claim 1 wherein at the one or more infrared sensors and the one or more acoustic sensors provide a 180° gunshot sensor device field of detection.

3. The method of claim 1 wherein the one or more infrared sensors and the one or more acoustic sensors alternate along a lateral perimeter of the gunshot sensor device unit.

4. The method of claim 1 wherein the gunshot sensor device unit is semicircular in disposition.

5. The method of claim 1 wherein at least three infrared sensors and at least three acoustic sensors are mounted in vertical, heterogeneous pairs around a lateral perimeter of the gunshot sensor device unit.

6. The method of claim 1 wherein at least six infrared sensors perform the collecting of the infrared information.

7. The method of claim 6 wherein at least six acoustic sensors perform the collecting of the acoustic information.

8. The method of claim 7 wherein the at least six infrared sensors and the at least six acoustic sensors enable a 360° gunshot sensor device field of detection.

9. The method of claim 8 wherein the gunshot sensor device unit is circular in disposition.

10. The method of claim 8 wherein the at least six infrared sensors and the at least six acoustic sensors are mounted in vertical, heterogeneous pairs around a lateral perimeter of the gunshot sensor device unit.

11. The method of claim 1 further comprising powering the gunshot sensor device using a solar panel coupled to the gunshot sensor device unit.

12. The method of claim 1 wherein the gunshot sensor device unit is mounted in an outdoor environment.

13. The method of claim 12 wherein the gunshot sensor device unit is mounted at least two meters above the ground.

14. The method of claim 1 wherein the gunshot sensor device unit includes three infrared sensors and three acoustic sensors and is positioned against a solid backing structure.

15. The method of claim 1 wherein the gunshot sensor device unit includes six infrared sensors and six acoustic sensors and is positioned at least two meters from any solid backing structure.

16. The method of claim 1 wherein the detecting is based on information only from the gunshot sensor device unit.

17. The method of claim 16 wherein the gunshot sensor device unit includes embedded processing to perform the detecting.

18. The method of claim 17 wherein the gunshot sensor device unit includes embedded network connectivity to communicate the detecting.

19. The method of claim 1 wherein the analysis of the infrared information and the acoustic information includes making a correspondence between a gunshot sound and an infrared event that occurred in time before the gunshot sound.

20. The method of claim 1 wherein detecting the gunshot activates a video monitoring device.

21. The method of claim 1 wherein the one or more infrared sensors are cooled using thermoelectric cooling.

22. An apparatus for gunshot analysis comprising:

one or more infrared sensors of a gunshot sensor device, wherein the one or more infrared sensors collect infrared information in a near-infrared (NIR) band;

one or more acoustic sensors of the gunshot sensor device that are co-located in a gunshot sensor device unit with the one or more infrared sensors;

an analysis device, coupled to the one or more infrared sensors and the one or more acoustic sensors, wherein the analysis device comprises at least one processing element;

a communication device, coupled to the analysis device, wherein the communication device provides notification of a gunshot detection, based on an output from the analysis device; and a power source, co-located with the gunshot sensor device unit, wherein the power source energizes the one or more infrared sensors, the one or more acoustic sensors, the analysis device, and the communication device.

23. A computer system for gunshot analysis comprising:

a memory which stores instructions;

one or more processors coupled to the memory wherein the one or more processors, when executing the instructions which are stored, are configured to:

collect, by one or more infrared sensors of a gunshot sensor device, infrared information in a near-infrared (NIR) band;

collect, by one or more acoustic sensors of the gunshot sensor device that are co-located in a gunshot sensor device unit with the one or more infrared sensors, acoustic information; and detect a gunshot using the gunshot sensor device based on analysis of the infrared information and the acoustic information.

* * * * *